United States Patent
Lim et al.

(10) Patent No.: US 10,570,243 B2
(45) Date of Patent: Feb. 25, 2020

(54) NON-TIN CATALYST FOR CURING ALKOXYSILYL-CONTAINING POLYMER

(71) Applicant: Momentive Performance Materials Inc., Waterford, NY (US)

(72) Inventors: Tom Lim, Killingworth, CT (US); Masaki Minato, Elmsford, NY (US); Mike Seeber, New York, NY (US); Misty Huang, New City, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 15/702,002

(22) Filed: Sep. 12, 2017

(65) Prior Publication Data

US 2018/0072837 A1   Mar. 15, 2018

Related U.S. Application Data

(60) Provisional application No. 62/393,366, filed on Sep. 12, 2016.

(51) Int. Cl.
| | |
|---|---|
| *C08K 5/544* | (2006.01) |
| *C08G 18/22* | (2006.01) |
| *C08G 18/10* | (2006.01) |
| *C08G 18/16* | (2006.01) |
| *C08G 18/20* | (2006.01) |
| *C08G 18/48* | (2006.01) |
| *C08G 18/71* | (2006.01) |
| *C08G 18/75* | (2006.01) |
| *C08G 77/08* | (2006.01) |
| *C09D 175/08* | (2006.01) |
| *C09J 175/08* | (2006.01) |
| *C08G 77/18* | (2006.01) |
| *C08K 13/02* | (2006.01) |

(52) U.S. Cl.
CPC ........... *C08G 18/222* (2013.01); *C08G 18/10* (2013.01); *C08G 18/163* (2013.01); *C08G 18/2063* (2013.01); *C08G 18/4825* (2013.01); *C08G 18/718* (2013.01); *C08G 18/755* (2013.01); *C08G 77/08* (2013.01); *C09D 175/08* (2013.01); *C09J 175/08* (2013.01); *C08G 77/18* (2013.01); *C08K 13/02* (2013.01)

(58) Field of Classification Search
None
See application file for complete search history.

(56) References Cited

U.S. PATENT DOCUMENTS

| | | | |
|---|---|---|---|
| 7,485,729 B2 | 2/2009 | Hsieh et al. | |
| 7,781,525 B2 * | 8/2010 | Yano | C08K 5/09 525/102 |
| 7,807,756 B2 * | 10/2010 | Wakabayashi | C08K 5/16 502/150 |
| 7,960,459 B2 * | 6/2011 | Noro | C08G 65/336 524/195 |
| 8,501,856 B2 | 8/2013 | Correia et al. | |
| 8,912,113 B2 | 12/2014 | Ravichandran et al. | |
| 8,937,141 B2 | 1/2015 | Sumi et al. | |
| 9,321,878 B2 | 4/2016 | Huang et al. | |
| 2006/0128919 A1 * | 6/2006 | Okamoto | C08L 101/10 528/25 |
| 2007/0265409 A1 * | 11/2007 | Wakabayashi | C08K 5/16 528/28 |
| 2009/0171025 A1 * | 7/2009 | Matsushita | C08G 65/336 525/100 |
| 2009/0182091 A1 | 7/2009 | Noro et al. | |
| 2009/0182099 A1 | 7/2009 | Noro | |
| 2009/0186993 A1 | 7/2009 | Noro | |
| 2011/0207886 A1 * | 8/2011 | Wakabayashi | C07F 7/126 525/102 |
| 2015/0099849 A1 * | 4/2015 | Nakamura | C08K 5/59 525/326.1 |
| 2015/0126678 A1 * | 5/2015 | Kramer | C08G 18/4866 524/590 |
| 2015/0166859 A1 | 6/2015 | Choffat et al. | |
| 2016/0200875 A1 * | 7/2016 | Patel | C08G 77/442 528/33 |

FOREIGN PATENT DOCUMENTS

| | | | |
|---|---|---|---|
| EP | 1985666 A1 | 10/2008 | |
| WO | 2015026687 A1 | 2/2015 | |
| WO | WO-2016027475 A1 * | 2/2016 | ............. C08K 5/057 |

OTHER PUBLICATIONS

Technical Data sheet for Kaneka MS polymer, 1 page, Aug. 8, 2018. (Year: 2018).*
Patent Cooperation Treaty Search Report dated Dec. 21, 2017.

* cited by examiner

*Primary Examiner* — Robert S Loewe
(74) *Attorney, Agent, or Firm* — James C. Abruzzo

(57) ABSTRACT

A non-tin catalyst for accerating the curing of alkoxysilyl-containing polymer contains a mixture and/or complex of organotitanium compound and a compound containing at least one (—)$_2$N—C=N— linkage.

31 Claims, No Drawings

NON-TIN CATALYST FOR CURING ALKOXYSILYL-CONTAINING POLYMER

CROSS-REFERENCE TO RELATED APPLICATIONS

This application claims priority to Provisional Application Ser. No. 62/393,366, filed Sep. 12, 2016, the entire contents of which are incorporated herein by reference.

FIELD OF THE INVENTION

This invention relates to the field of catalysts for the curing of alkoxysilyl-containing polymers and, more particularly, non-tin catalysts for the curing of alkoxysilyl-containing silicone and non-silicone resins.

BACKGROUND OF THE INVENTION

Moisture-curable compositions, based on alkoxysilyl-containing polymers, are known. Such polymers undergo hydrolysis and condensation on contact with moisture, typically in the presence of a cure catalyst. Suitable known catalysts for curing alkoxysilyl-containing polymers include organometallic compounds containing metals such as tin, titanium, zirconium, zinc and bismuth. Organotin compounds such as, e.g., dibutyltin dilaurate (DBTDL) are widely used as catalysts to accelerate the curing of a number of different alkoxysilyl-containing silicone and non-silicone resins and moisture-curable compositions such as coatings, sealants and adhesives formulated with such resins. Environmental regulatory agencies and directives, however, have increased, or are expected to increase, restrictions on the use of organotin compounds in formulated products. While formulations containing greater than 0.5 weight percent DBTDL currently require labeling as toxic under a reproductive 1B classification, DBTDL-containing formulations are proposed to be completely phased out in consumer applications within the next few years.

Other organotin compounds such as dioctyltin and dimethyltin may be given a temporary reprieve from regulation but will likely be regulated in the near future. It would therefore be beneficial to provide non-tin metal catalysts for the curing of alkoxysilyl-containing polymers of both the silicone and non-silicone types.

Desirably, substitutes for organotin curing catalysts should exhibit performance profiles that are about as good as, if not better than, those of organotin compounds in terms of curing rate, storage stability and properties of the cured compositions. There have been many proposals for the replacement of organotin compounds by other organometallic compounds. Each of the proposed tin substitutes has its particular advantages and disadvantages compared with known organotin cure catalysts. Therefore, there remains a need to overcome deficiencies of known organometallic cure catalysts for the curing of alkoxysilyl-containing polymers.

SUMMARY OF THE INVENTION

In accordance with an aspect of the present invention, there is provided a moisture-curable composition comprising:

a) at least one alkoxysilyl-containing polymer;

b) at least one non-tin cure catalyst comprising a mixture and/or complex of an organotitanium compound and a compound containing at least one (—)$_2$N—C=N— linkage; and, optionally, c) at least one mercapto-functional silicon-containing compound.

In addition to the catalyst being based on a metal other than tin and therefore not subject to the regulatory concerns currently surrounding organotin cure catalysts, non-tin cure catalyst (b) generally exhibits several advantageous properties compared with those of conventional organotin cure catalysts such as the aforementioned DBTDL. For example, curing rates as determined by the skin over time (SOT) test procedure described herein have been found to be significantly faster than those of DBTDL.

And unlike conventional organotin catalysts and other conventional organometallic catalysts which have been found to exhibit prolonged, and indeed, impractically lengthy cure times for alkoxysilyl-containing polymers wherein the alkoxy group(s) bonded to the silicon atoms contain two or more carbon atoms, non-tin cure catalyst (b) has generally been found to provide excellent cure rates for such alkoxysilyl-containing resins. Alkoxy groups having two or more carbon atoms are desirable since these alkoxy groups upon hydrolysis do not generate methanol, a hazardous air pollutant.

DETAILED DESCRIPTION OF THE INVENTION

In the specification and claims herein, the following terms and expressions are to be understood as having the hereinafter indicated meanings.

The singular forms "a," "an" and "the" include the plural.

Other than in the working examples or where otherwise indicated, all numbers expressing amounts of materials, reaction conditions, time durations, quantified properties of materials, and so forth, stated in the specification and claims are to be understood as modified by the term "about".

All methods described herein may be performed in any suitable order unless otherwise indicated or otherwise clearly excluded by context. The use of any and all examples or exemplary language (e.g., "such as" or "include") provided herein is intended merely to better illuminate the invention and does not limit the scope of the invention unless such is clearly intended to be the case.

No language in the specification should be construed as indicating any non-claimed element as essential to the practice of the invention.

As used herein, the terms "comprising," "including," "containing," "characterized by" and terms of like import are to be understood as inclusive or open-ended and as not excluding additional, unrecited elements or method steps; additionally, such terms are to be understood as including the more restrictive terms "consisting of" and "consisting essentially of."

Composition percentages are given in weight percent unless otherwise indicated.

It will be understood that a particular numerical value includes at least that value unless the context clearly indicates otherwise and that any range of numerical values includes all sub-ranges of values within that range and any combination of the various endpoints of such ranges or sub-ranges.

It will be further understood herein that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "alkoxysilyl-containing polymer" shall be understood herein to apply to any polymer containing one or more terminal and/or pendant alkoxysilyl groups.

The tens "silylation" and "silylated" shall be understood herein to apply to any of the conventional or otherwise known methods whereby an alkoxysilyl group is introduced into, or made part of, a silicone or non-silicone polymer thereby rendering the polymer moisture curable. As such, the term "silylation" and "silylated" are to be considered as inclusive of "hydrosilylation" and "hydrosilylated", respectively.

The term "complex" shall be understood herein to apply to the interaction of the titanium metal with the compound containing at least one (—)$_2$N—C=N— linkage where the interaction may be a covalent bond or a dative bond.

The term "curing" shall be understood herein to refer to the sequence of chemical changes by which the alkoxyl group(s) of an alkoxysilyl-containing polymer in the presence of moisture first undergo hydrolysis, the hydrolyzed product thereafter undergoing condensation with itself and/or with other hydrolyzed and/or unhydrolyzed components of a formulated product.

The term "polymer" as used herein shall be understood to be synonymous with "resin" and vice versa.

The term "moisture" as it pertains to the hydrolysis of an alkoxysilyl-containing polymer shall be understood herein to include liquid water and water vapor.

As used herein, the term "monovalent" in reference to a group means that the group is capable of forming one covalent bond per group. As used herein, the term "polyvalent" in reference to a group means that the group is capable of forming two or more covalent bonds per group.

As used herein, the term "hydrocarbon group" is a group consisting of carbon and hydrogen atoms and includes acyclic hydrocarbon groups, alicyclic hydrocarbon groups and aromatic hydrocarbon groups.

The term "heteroatom" means any of the Group 13-17 elements except carbon and includes, e.g., oxygen, nitrogen, silicon, sulfur, phosphorus, fluorine, chlorine, bromine and iodine.

As used herein, the term "acyclic hydrocarbon group" means any straight chain or branched hydrocarbon group, preferably containing from 1 to about 60 carbon atoms, which may be saturated or unsaturated. Suitable monovalent acyclic hydrocarbon groups include alkyl, alkenyl and alkynyl groups. Representative and non-limiting examples of monovalent acyclic hydrocarbon groups are methyl, ethyl, sec-butyl, tert-butyl, octyl, decyl, dodecyl, cetyl, stearyl, ethenyl, propenyl, and butynyl. Suitable divalent acyclic hydrocarbon groups include linear or branched alkylene groups. Representative and non-limiting examples of divalent acyclic hydrocarbon groups are methylene, ethylene, propylene, hexylene, methylethylene, 2-methylpropylene and 2,2-dimethylpropylene. Suitable trivalent acyclic hydrocarbon radicals include alkanetriyl radicals such as 1,1,2-ethanetriyl, 1,2,4-butanetriyl, 1,2,8-octanetriyl and 1,2,4-hexanetriyl.

As used herein the term "alkyl" means any saturated straight or branched monovalent hydrocarbon group. In a preferred embodiment, monovalent alkyl groups are selected from linear or branched alkyl groups containing from 1 to about 60 carbons per group such as, e.g., methyl, ethyl, propyl, iso-propyl, n-butyl, iso-butyl, sec-butyl, tert-butyl, pentyl, hexyl, heptyl, decyl and dodecyl.

As used herein the term "alkenyl" means any straight or branched monovalent hydrocarbon group containing at least one carbon-carbon double bond and preferably containing from 2 to about 10 carbon atoms such as, e.g., ethenyl, 2-propenyl, 3-butenyl, 5-hexenyl and 7-octenyl.

As used herein, the term "alicyclic hydrocarbon group" means a group containing one or more hydrocarbon rings, preferably containing from 3 to 12 carbon atoms, which may optionally be substituted on one or more of the rings with one or more monovalent or divalent acyclic group containing preferably 1 to about 6 carbon atoms. In the case of an alicyclic hydrocarbon group containing two or more rings, the rings may be fused rings in which the two rings share two or more carbon atoms in common, or rings that are bonded to each other through a covalent bond or divalent acyclic group. Suitable monovalent alicyclic hydrocarbon groups include, e.g., cycloalkyl groups such as cyclohexyl and cyclooctyl or cycloalkenyl groups such as cyclohexenyl. Suitable divalent hydrocarbon groups include, e.g., saturated or unsaturated divalent monocyclic hydrocarbon groups such as, e.g., 1,4-cyclohexylene. Suitable trivalent alicyclic hydrocarbon groups include cycloalkanetriyl groups such as 1-ethylene-2,4-cyclohexylene and 1-methylethylene-3-methyl-3,4-cyclohexylene.

As used herein, the term "aromatic hydrocarbon group" means a hydrocarbon group containing one or more aromatic rings, which may optionally be substituted on the aromatic rings with one or more monovalent or divalent acyclic groups preferably containing from 1 to about 6 carbon atoms. In the case of an aromatic hydrocarbon group containing two or more rings, the rings may be fused rings in which the rings share two or more carbon atoms in common, or rings that are bonded to each other through a covalent bond or divalent acyclic group. Suitable monovalent aromatic hydrocarbon groups include, e.g., phenyl, tolyl, 2,4,6-trimethylphenyl, naphthyl and anthryl as well as aralkyl groups such as 2-phenylethyl. Suitable divalent aromatic hydrocarbon groups include divalent monocyclic arene groups such as 1,2-phenylene, 1,4-phenylene, 4-methyl-1,2-phenylene and phenylmethylene. Suitable trivalent aromatic hydrocarbon groups include, e.g., 1,3,5-phenylene and 1,2,4-phenylene.

The expression "non-tin" as applied to non-tin cure catalyst (b) of the moisture curable composition herein shall be understood to mean that the catalyst is based upon a metal other than tin, in particular, titanium. Non-tin catalyst (b) will be considered "tin-free" if it contains less than about 1,000, more particularly less than 100, and still more particularly less than 1, ppm tin as impurity, based on the total weight of cure catalyst (b).

The components of the moisture-curable composition of the invention, i.e., its alkoxysilyl-containing polymer (a), non-tin cure catalyst (b), and if utilized, optional mercapto-functional silicon compound (c) or any other optional material(s) (d), will now be described in detail.

(1) Alkoxysilyl-Containing Polymer (a)

(i) Alkoxysilyl-Containing Silicones

According to one embodiment of the invention, alkoxysilyl-containing polymer component (a) is an alkoxysilyl-containing silicone comprising divalent units of the formula —(R$_2$SiO)— in the backbone wherein each R group independently is a C$_1$-C$_{10}$-alkyl; a C$_1$-C$_{10}$ alkyl substituted with one or more of Cl, F, N, O or S; phenyl; a C$_7$-C$_6$ alkylaryl; a C$_7$-C$_1$ arylalkyl; or a C$_2$-C$_4$ polyoxyalkylene ether or combination of two or more such groups.

According to another embodiment of the invention, alkoxysilyl-containing polymer (a) is an alkoxysilyl-containing silicone of general Formula (I):

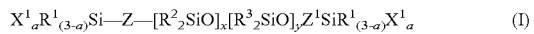

$$X^1{}_aR^1{}_{(3-a)}Si\text{—}Z\text{—}[R^2{}_2SiO]_x[R^3{}_2SiO]_yZ^1SiR^1{}_{(3-a)}X^1{}_a \qquad (I)$$

wherein subscript x is 0 to about 10,000; subscript y is 0 to about 1,000; a is 1, 2 or 3; $R^1$ is independently an alkyl group having from 1 to 6 carbon atoms, a phenyl group or arenyl group having from 7 to about 12 carbon atoms; $R^2$ is methyl; Z is —O— or divalent $C_dH_{2d}$ group where d is 2 to about 6; $Z^1$ is a bond or a $SiR^3{}_2R^4$ group where $R^4$ is a divalent $C_dH_{2d}$ group; $R^3$ is a $C_1$-$C_{10}$ alkyl, a $C_1$-$C_{10}$ alkyl substituted with one or more of Cl, F, N, O or S, phenyl, a $C_7$-$C_{10}$ alkylaryl, a $C_7$-$C_{16}$ arylalkyl, a $C_2$-$C_4$ polyalkylene ether or a combination of two or more such groups; and, $X^1$ is independently an alkoxy group having from 1 to about 6 carbon atoms, or an alkoxy group having from 1 to about 6 carbon atoms and at least one ether or ester functional group.

In one particular embodiment of the invention, alkoxysilyl-containing polymer (a) is an alkoxysilyl-containing silicone of general Formula (II):

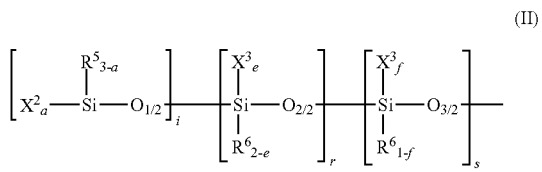

(II)

wherein:
each $R^5$ is independently an alkyl group having from 1 to 6 carbon atoms, a phenyl group or arenyl group having from 7 to about 12 carbon atoms; each $R^6$ is independently a monovalent hydrocarbon group chosen from straight chain alkyl having from 1 about 10 carbon atoms, branched chain alkyl having from 3 to about 10, cyclo alkyl groups having from 3 to about 10 carbon atoms, phenyl and an arenyl group containing from 7 to 10 carbon atoms;
each $X^2$ is independently an alkoxy group having from 1 to about 6 carbon atoms or an alkoxy group having from 1 to about 6 carbon atoms and at least one ether or ester functional group;
each $X^3$ is independently a hydrolyzable group —$OR^6$; and, a is 1, 2 or 3, e is 0 to 2, f is 0 or 1, i is 0 to 25, r is 0 to 100 and s is 0 to about 100, with the provisos that 4≤i+r+s≤125, (ai+er+fs)/(3i+2r+s) is from 0.05 to 0.6 and all of the half oxygen atoms, $O_{1/2}$, in a repeat unit are matched with another half oxygen atom in a different repeat unit to form a full oxygen atom, —O—, which covalently links two repeat units together.

In certain embodiments, i, r, and s are selected such that the alkoxysilyl-containing silicone resin has a weight average molecular weight in the range of from about 400 to about 10,000, e.g., from about 500 to about 2,500, as determined in accordance with DIN Standard 55672 (1) using polystyrene standards.

Alkoxysilyl-containing silicone resins that are suitable for use as component (a) in the moisture-curable composition of the invention are commercially available and include, e.g., CoatOSil 165 and TSR 1452 (Momentive Performance Materials Inc.), DC-3074, DC-3037, DC-840, Z6018, Q1-2530 and 6-2230 (Dow Corning) and SY-550 and SY-231 (Wacker Silicones).

(ii) Alkoxysilyl-Containing Non-Silicone Polymers

According to another aspect of the invention, alkoxysilyl-containing polymer (a) can be an alkoxysilyl-containing non-silicone resin, e.g., a silylated resin of general Formula (III):

(III)

wherein:
P is a polymer residue derived from at least one addition or condensation monomer;
L is a divalent linking group;
each $R^7$ is independently an alkyl group having from 1 to 6 carbon atoms, a phenyl group or an arenyl group having from about 7 to about 12 carbon atoms;
each $X^4$ is independently an alkoxy group having from 1 to about 6 carbon atoms or an alkoxy group having from 1 to about 6 carbon atoms and at least one ether or ester functional group;
each a is independently 1, 2 or 3; and,
q is from 1 to about 15.

In certain embodiments of the moisture-curable composition of the invention, in the alkoxysilyl-containing non-silicone resin of Formula (III), each $R^7$ is independently methyl or ethyl, a is 2 or 3 and q is 2 to about 6.

In certain embodiments of the moisture-curable composition of the invention, in the alkoxysilyl-containing polymers of Formula (III), linking group L has the general Formula (IIIa):

(IIIa)

wherein:
each $R^8$ is independently a divalent hydrocarbylene group containing from 1 to 12 carbon atoms;
each $A^1$ is independently selected from divalent oxygen (—O—), sulfur (—S—) or substituted nitrogen of the structure (—)$_2NR^9$ wherein $R^9$ is hydrogen, alkyl, alkenyl, arenyl, aryl, aralkyl, alkyl containing at least one ester functional group or
—$R^8SiR^7{}_{(3-a)}X^4{}_a$ group, wherein each $R^9$, other than hydrogen contains from 1 to about 18 carbon atoms; each $A^2$ is independently selected from divalent oxygen (—O—), sulfur (—S—) or substituted nitrogen of the structure (—)$_2NR^9$ wherein $R^9$ is hydrogen, alkyl, alkenyl, arenyl, aryl, aralkyl, alkyl containing at least one ester functional group or —$R^8SiR^7{}_{(3-a)}X^4{}_a$ group wherein each $R^9$, other than hydrogen contains from 1 to about 18 carbon atoms; and, subscript a is 1, 2 or 3 and subscript b is 0 or 1.

In one embodiment, divalent linking group L is -[$A^1$-C(=O)-$A^2$]$_b$-$R^8$— where $A^1$ is —O— or —NH—, $A^2$ is —O— or —NH—, and with the provisos that when $A^1$ is —O—, $A^2$ is —NH— and when $A^1$ is —NH—, $A^2$ is —O—.

In one embodiment, divalent hydrocarbylene group $R^8$ may optionally be substituted or interrupted with one or more heteroatoms and/or functional groups that do not interfere with the cure mechanism of the moisture-curable composition herein and/or the proper functioning of an optional component contained therein such as the adhesion promoters described below. Thus, e.g., divalent hydrocarbylene group $R^8$ can contain functionality such as hydroxyalkyl, cyanoalkyl, carboxyalkyl, alkyloxy, oxalkyl, alkylcarbonyloxaalkylene, carboxamide and haloalkyl, such as hydroxypropyl, cyanoethyl, butoxy-2,5,8-trioxandecanyl, carboxymethyl, chloromethyl, 3,3,3-fluoropropyl, methyleneoxypropylene and 1,2,6-triyl-4-oxahexane.

The silylatable polymer from which the alkoxysilyl-containing non-silicone resin of Formula (III) is produced, i.e., the polymer providing polymer residue P of Formula (III), can be selected from among any of those heretofore known for use in the manufacture of alkoxysilyl-containing non-silicone resin. Thus, e.g., the silylatable polymer can possess a polymer backbone which is one of polyether, polyester, polyether-co-polyester, polyester-co-polyether, polythioether, polyamine, polyamide, polyester-co-polyamide, polyacrylate, polyacetal, polycarbonate, polybutadiene, polyolefin, polyurethane, polyurea, polyacrylate, polymethacrylate and the like.

More particularly, the silylatable polymer can be selected from the group consisting of polyether polyol, polyester polyol, hydroxyl-terminated polyacrylate, hydroxyl-terminated polymethacrylate, hydroxyl-terminated polybutadiene, polyolefin possessing terminal olefinic unsaturation, polyether possessing terminal olefinic unsaturation, hydroxyl-terminated and isocyanate-terminated polyurethanes derived from the reaction of polyether polyol, polyester polyol, hydroxyl-terminated polyacrylate, hydroxyl-terminated polymethacrylate, hydroxyl-terminated polybutadiene, etc., with polyisocyanate, primary and/or secondary amine-terminated polyurea derived from the reaction of amine-terminated polyether, amine-terminated polyester, etc., with polyisocyanate, and similar such silylatable polymers.

The alkoxysilyl-containing non-silicone resin of Formula (III) can be obtained by silylating these and similar silylatable polymers in any known or conventional manner. For example, a polymer possessing active hydrogen-containing functionality, i.e., hydroxyl, mercapto, primary amine and/or secondary amine functionality, can be silylated by reaction with an isocyanatosilane, an isocyanate-terminated polymer can be silylated with a silane possessing functionality that is reactive for isocyanate such as mercapto or amine functionality, and an olefinically unsaturated polymer can be silylated by reaction with a hydridosilane (hydrosilane) under hydrosilation reaction conditions.

In one embodiment, polymer residue P in the alkoxysilyl-containing non-silicone resin of Formula (III) possesses a number average molecular weight of from about 500 to about 50,000, and in another embodiment, a number average molecular weight of from about 2,000 to about 20,000, where the number average molecular weight is determined by titration of the end-groups of the polymer from which the polymer residue is derived.

Some particularly useful moisture-curable silylated resins of Formula (III) and their preparation will now be more fully described.

Alkoxysilyl-Containing Non-Silicone Resins Obtained from Active Hydrogen-Containing Silylatable Polymers Alkoxysilyl-containing non-silicone resin of Formula (III) can be obtained by the silylation of one or a mixture of active hydrogen-containing silylatable polymers such as (i) polyether polyols; (ii) polyester polyols; (iii) hydroxyl-terminated polybutadienes; (iv) hydroxyl-terminated polyurethanes derived from, e.g., polyols (i), (ii) and/or (iii); and, (v) primary and secondary amine-terminated polyureas and/or polyurethanepolyurea, employing isocyanatoalkoxysilane as silylating reactant. Preparation of the silylated resins can be carried out in the presence or absence of a catalyst.

Examples of suitable polyols include poly(oxyalkylene)ether diols (i.e., polyether diols), in particular, poly(oxyethylene)ether diols, poly(oxypropylene)ether diols and poly(oxyethylene-oxypropylene)ether diols, poly(oxyalkylene)ether triols, poly(tetramethylene)ether glycols, polyacetals, polyhydroxy polyacrylates, polyhydroxy polymethacrylates, polyhydroxy polyester amides, polyhydroxy polythioethers, polycaprolactone diols and triols, polybutadiene diols, and the like. In one embodiment of the invention, the polyols used in the production of the alkoxysilyl-containing non-silicone resin are poly(oxyethylene)ether diols with number average molecular weights (Mn) between about 500 grams per mole and about 25,000 grams per mole. In another embodiment of the invention, the polyols used in the production of the moisture-curable silylated resins are poly(oxypropylene)ether diols with number average molecular weights between about 1,000 grams per mole and about 20,000 grams per mole. The number average molecular weights are determined from the hydroxyl number of the polyols. Mixtures of polyols of various structures, molecular weights and/or functionalities can also be used.

The number average molecular weights are determined by titration of the hydroxyl groups according to ASTM D4274-11, Standard Test Methods for Testing Polyurethane Raw Materials: Determination of Hydroxyl Numbers of Polyols.

The polyether polyols can have a functionality up to about 8 or from about 1 to about 8, but advantageously have a functionality of from 2 to 4 and more advantageously, a functionality of 2 (i.e., diols). Especially suitable are the polyether polyols prepared in the presence of double-metal cyanide (DMC) catalysts, an alkaline metal hydroxide catalyst, or an alkaline metal alkoxide catalyst; see, e.g., U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420 and 5,266,681, the entire contents of each of which is incorporated by reference herein. Polyether polyols produced in the presence of such catalysts tend to have high molecular weights and low levels of unsaturation, properties which are believed to impart improved performance of compositions derived therefrom. In an embodiment, the polyether polyols preferably have a number average molecular weight of from about 1,000 grams per mole to about 25,000 grams per mole, more preferably from about 2,000 grams per mole to about 20,000 grams per mole and more preferably still from about 4,000 grams per mole to about 18,000 grams per mole. The levels of terminal ethylenic unsaturation are generally less than about 0.2, preferably less than about 0.02, and more preferably less than about 0.008 milliequivalents per gram (meq/g) of polyol. Examples of commercially available diols that are suitable for making the moisture-curable silylated resins herein include, but are not limited to, Arcol® R-1819 (number average molecular weight of 8,000 grams per mole), Arcol® E-2204 (number average molecular weight of 4,000 grams per mole) and Arcol® E-2211 (number average molecular weight of 11,000 grams per mole), all available from Covestro AG, previously known as Bayer Material Science.

Among the hydroxyl-terminated polybutadienes that are useful for preparing alkoxysilyl-containing polymer (a) are those possessing a number average molecular weight of from about 500 to about 10,000, and advantageously from about 800 to about 5,000, grams per mole, a primary hydroxyl group content of from about 0.1 to about 6.0, and advantageously from about 0.3 to about 1.8, milliequivalents per gram, a degree of hydrogenation of from 0 up to 100, preferably 5 to 50, more preferably 10 to 30 percent of the olefinic sites present and an average content of copolymerized additional monomer(s) of from 0 up to about 50 weight percent.

Hydroxyl-terminated polybutadienes of the above-described type, averaging more than one predominantly primary hydroxyl group per molecule, e.g., averaging from about 1.7 to about 3 or more primary hydroxyl groups per molecule, are suitably employed herein. More specifically, the hydroxyl-terminated polybutadienes possess an average of at least 2, and advantageously from about 2.4 up to about 2.8, hydroxyl groups per molecule, the hydroxyl groups being predominantly in terminal allylic positions on the main, i.e., generally the longest, hydrocarbon chain of the molecule. By "allylic" configuration is meant that the alpha-allylic grouping of allylic alcohol, i.e., the terminal hydroxyl groups of the polymer, are bonded to carbon atoms adjacent to double bonded carbon atoms.

The ratio of cis-1,4, trans-1,4 and 1,2-vinyl unsaturation which occurs in the hydroxyl-terminated butadiene polymers, the number and location of the hydroxyl groups and the molecular weight of the polymers will be influenced by the process employed for their manufacture, the details of which are known in the art.

The useful hydroxyl-terminated polybutadienes herein can also incorporate one or more other copolymerizable monomers which can confer particularly desirable properties upon the silylated polymers herein. The total amount of copolymerized monomer will not exceed, on average, about 50 weight percent of the hydroxyl-terminated polybutadiene copolymer. Included among the copolymerizable monomers are monoolefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

Silylatable hydroxyl-terminated polyurethane prepolymers can be obtained by employing polyols such as those described above, polyisocyanates and optional catalysts (preferably condensation catalysts), the proportions of polyol and polyisocyanate being such as to result in hydroxyl-termination in the resulting prepolymer. Thus, e.g., in the case of a diol and a diisocyanate, a molar excess of the former will be used thereby resulting in hydroxyl-terminated polyurethane prepolymer.

The hydroxyl-terminated polyurethane prepolymer can also be prepared from a reaction mixture containing one or more chain extenders and/or one or more other polyols. Examples of suitable chain extenders include polyhydric alcohols such as ethylene glycol, propylene glycol, propane-1,3-diol, butane-1,4-diol, hexane-1,6-diol, diethylene glycol, triethylene glycol, tetraethylene glycol, dipropylene glycol, triethylene glycol, tetrathylene glycol, dipropylene glycol, tripropylene glycol, tetrapropylene glycol and the like. Additional polyols can be chosen from polyols described above and include polyether polyols, polyester polyols, polyetherester polyols, polyesterether polyols, polybutadienediols, polyoxyalkylene diols, polyoxyalkylene triols, polytetramethylene glycols, polycaprolactone diols and triols, and the like, all of which possess at least two primary hydroxyl groups.

Suitable organic polyisocyanates for preparing silylatable hydroxyl-terminated polyurethane prepolymers include any of the known and conventional organic polyisocyanates, especially organic diisocyanates, from which polyurethane polymers have heretofore been obtained. Useful diisocyanates include, e.g., 2,4-toluene diisocyanate, 2,6-toluene diisocyanate, 4,4'-diphenyl-methanediisocyanate, isophorone diisocyanate, dicyclohexylmethane-4,4'-diisocyanate, various liquid diphenylmethane-diisocyantes containing a mixture of 2,4- and 4,4'-isomers, Desmodur (Bayer) and the like, and mixtures thereof. Isophorone diisocyanate (IPDI) is especially advantageous for use in preparing the silylatable polyurethane prepolymers herein.

Catalysts for the preparation of polyurethanes are known in the art. Particularly suitable catalysts useful in the preparation of the silylatable hydroxyl-terminated polyurethane prepolymer include zirconium-containing and bismuth-containing complexes such as KAT XC6212, K-KAT XC-A209 and K-KAT 348 (King Industries, Inc.), titanium chelates such as the TYZOR® types (DuPont), KR types (Kenrich Petrochemical, Inc.) and other organometallic catalysts, e.g., those containing a metal such as Al, Zn, Co, Ni, Fe, and the like.

As indicated above, silylatable hydroxyl-terminated polyurethane prepolymers can be prepared by the reaction of an organic polyisocyanate, e.g., a diisocyanate such as any of those mentioned above, and advantageously isophorone diisocyanate, with a stoichiometric excess of the selected polyol(s). Depending on the reactivity of the respective reactants, a catalyst such as any of those mentioned above can be employed. The reaction temperature is typically in the range of from about 60° C. to about 90° C.; the reaction time is typically on the order of from about 2 to about 8 hours. The reaction mixture can also contain one or more chain extenders and/or other polyols such as any of those mentioned above.

To prepare the silylatable hydroxyl group-terminated polyurethane prepolymers, at least a slight molar excess of the hydroxyl equivalents of the polyols (OH groups) with respect to the isocyanate equivalents of the polyisocyanate (NCO groups) is employed to terminate the prepolymer chains with hydroxyl groups. Advantageously, the molar ratio of NCO to OH is from about 0.3 to about 0.95, and more preferably from about 0.5 to about 0.90, depending on the specific polyols or mixture of polyols and/or chain extenders employed.

Reactants that are useful for silylating the hydroxyl-terminated polymers, supra, are isocyanatosilanes of general Formula (IV):

$$O=C=N-R^{11}-SiR^{10}_{(3-a)}X^5_a \qquad (IV)$$

wherein each $R^{10}$ is independently an alkyl group having from 1 to 6 carbon atoms, a phenyl group or an arenyl group having from about 7 to about 12 carbon atoms; $R^{11}$ is a divalent hydrocarbylene group containing from 1 to about 12 carbon atoms, optionally containing one or more heteroatoms, and more particularly an alkyl group having 1 to 3 carbon atoms; each $X^5$ is independently an alkoxy group having from 1 to about 6 carbon atoms, or an alkoxy group having from 1 to about 6 carbon atoms and at least one ether or ester functional group; and, a is 1, 2 or 3. In one embodiment, $R^{11}$ possesses from 1 to 4 carbon atoms, each $X^5$ is methoxy, ethoxy, propoxy or isopropoxy and a is 3.

Specific isocyanatosilanes (IV) that can be used herein to react with the aforementioned polyols and hydroxyl-terminated polyurethanes to provide moisture-curable silylated resins of Formula (III) include isocyanatomethyltrimethoxysilane, 3-isocyanatopropyltrimethoxysilane, isocyanatoisopropyltrimethoxysilane, 4-isocyanato-n-butyltrimethoxysilane, isocyanato-t-butyltrimethoxysilane, isocyanatomethylmethyldimethoxysilane, 3-isocyanatopropylmethyldimethoxysilane, 3-isocyanatopropyltriethoxysilane, isocyanatoisopropyltriethoxysilane, 4-isocyanato-n-butyltriethoxysilane, isocyanato-t-butyltriethoxysilane, and the like.

Catalysts that are useful for the silylation of the aforementioned polyols and hydroxyl-terminated polyurethanes include those indicated above to be suitable for use in the preparation of the hydroxyl-terminated polyurethanes. Depending on the reactivity of the reactants, the silylation reaction temperature may typically range from about 20° C.

to about 150° C. with the reaction time typically being on the order of from about 2 to about 16 hours. The reaction mixture can also contain one or more chain extenders and/or other polyols such as any of those mentioned above.

To prepare the alkoxysilyl-containing non-silicone polymer of Formula (III), the isocyanatosilane can be used in a slight molar excess or a slight molar deficiency of the hydroxyl equivalents of the polyols (OH groups) with respect to the NCO isocyanate equivalents of the isocyanatosilane (NCO groups). Advantageously, the molar ratio of NCO to OH is from about 0.7 to about 1.5, more preferably from about 0.9 to about 1.1 and more specifically still from about 0.98 to about 1.02.

Particularly useful alkoxysilyl-containing non-silicone resin of Formula (II) are prepared from polypropylene diols, aliphatic diisocyanates and 3-isocyanatopropyltrialkoxysilanes. The polypropylene diols advantageously have levels of terminal ethylenic unsaturation of less than about 0.02, and more advantageously less than about 0.008, milliequivalents per gram (meq/g) of polyol, and number average molecular weights as determined by hydroxyl end-group analysis of from about 5,000 to about 15,000 grams per mole. The molar ratio of isocyanate of the isocyanatosilane (NCO) to the hydroxyl of the hydroxyl-terminated polyurethane resin can range from about 0.9 to about 1.05 and more particularly from about 1.0 to about 1.5.

It is preferred that silylation of the hydroxyl-terminated silylatable resin be substantially complete, i.e., that essentially no hydroxyl groups be present following silylation when an excess of isocyanatosilane is used or that essentially no isocyanate groups be present following silylation when an excess of polyol is used where the alkoxysilyl-containing non-silicone resin is to be used for coating and sealing applications. As used herein, the substantial completeness of silylation, when an excess of polyol is used, is when more the 90 mole percent, preferably more than 95 mole percent, most preferably over 98 mole percent of the isocyanatosilane has reacted with the hydroxyl group of the hydroxyl-terminated silylatable resin. As used herein, the substantial completeness of silylation, when an excess of isocyanatosilane is used, is when more than 80 mole percent, preferably more than 90 mole percent, most preferably over 95 mole percent of the isocyanatosilane has reacted with the hydroxyl group of the hydroxyl-terminated silylatable resin. The amount of residual isocyanatosilane is determined by measuring the amount of isocyanate group. ASTM D2572-97(2010), Standard Test Method for Isocyanate Groups in Urethane Materials or Prepolymers, can be used to determine the amount of isocyanate groups.

Moisture-Curable Silylated Resins Obtained from Isocyanate-Terminated Polyurethanes/Polyureas Isocyanate-terminated polyurethanes can be obtained by reacting one or more polyols, advantageously, diols, with one or more polyisocyanates, advantageously, diisocyanates, in such proportions that the resulting prepolymers will be terminated with isocyanate. In the case of the reaction of a diol with a diisocyanate, a molar excess of diisocyanate is employed.

Included among the polyols that can be utilized for the preparation of the isocyanate-terminated polyurethane prepolymer are polyether polyols, polyester polyols such as the hydroxyl-terminated polycaprolactones, polyetherester polyols such as those obtained from the reaction of polyether polyol with e-caprolactone, polyesterether polyols such as those obtained from the reaction of hydroxyl-terminated polycaprolactones with one or more alkylene oxides such as ethylene oxide and propylene oxide, and polybutadiene polyols.

Specific suitable polyols include those indicated above to be useful for the preparation of hydroxyl-terminated polyurethanes. Similarly, any of the polyisocyanates mentioned above in connection with the preparation of hydroxyl-terminated polyurethanes are likewise useful for the preparation of isocyanate-terminated polyurethanes. The number average molecular weight of the polymer from which the polymer residual P of the silylated resin of general Formula (III) is determined from the isocyanate end-group analysis of the isocyanato-terminated polyurethanes. The isocyanate content of the isocyanato-terminated polyurethanes can be determined using the methods described in ASTM D2572-97(2010), Standard Test Method for Isocyanate Groups in Urethane Materials or Prepolymers.

Silylating agents for silylating the isocyanate-terminated polyurethanes described above must contain functionality that is reactive with isocyanate and at least one readily hydrolyzable and subsequently crosslinkable group, e.g., alkoxysilyl. Particularly useful silylating agents are silanes of general Formula (V):

$$G^1\text{-}R^{13}\text{---}SiR^{12}_{(3-a)}X^5_a \quad (V)$$

wherein $G^1$ is an active hydrogen-containing group that is reactive for isocyanate, e.g., —SH or —NHR$^{14}$ in which $R^{14}$ is hydrogen or alkyl, alkenyl, arenyl, aryl, aralkyl, alkyl containing at least one ester functional group or —R$^{13}$SiR$^{12}_{(3-a)}$X$^5_a$, in which each $R^{13}$ is the same or different divalent hydrocarbon group of up to about 12 carbon atoms, optionally containing one or more heteroatoms, each $R^{12}$ is independently an alkyl group having from 1 to 6 carbon atoms, a phenyl group or an arenyl group having from about 7 to about 12 carbon atoms; each $X^5$ is independently an alkoxy group having from 1 to about 6 carbon atoms, or an alkoxy group having from 1 to about 6 carbon atoms and at least one ether or ester functional group; and a is 1, 2 or 3.

Specific silylating silanes (V) include mercaptosilanes such as 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl tri-isopropoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilan, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 2-mercapto-2-methylethyl-tripropoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyltrimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane and, 3-mercaptopropylphenyl triethoxysilane; and, aminosilanes such as 3-aminopropyltrimethoxysilane, 3-aminopropyltriethoxysilane, 4-aminobutyltriethoxy-silane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropyl-methyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethyl-butyldimethoxymethylsilane, N-ethyl-4-amino-3,3-dimethylbutyltrimethoxy-silane, N-(cyclohexyl)-3-aminopropyltrimethoxysilane, N-(2-aminoethyl)-3-aminopropyltrimethoxysilane, N-(2-aminoethyl)-3-aminopropyltriethoxy-silane, N-(2-aminoethyl)-3-aminpropylmethyldimethoxyilane, aminopropyltriethoxysilane, bis-(3-trimethoxysilyl-2-methylpropyl)amine and N-(3'-trimethoxysilylpropyl)-3-amino-2-methylpropyltrimethoxysilane.

A catalyst will ordinarily be used in the silylation of the isocyanate-terminated polyurethanes. Advantageously, condensation catalysts are employed since such catalysts will also catalyze the curing (hydrolysis followed by crosslinking) of alkoxysilyl-containing non-silicone resin of Formula (III) component of the curable compositions of the invention. Suitable condensation catalysts include any of the catalysts indicated above as useful for the silylation of polyols and hydroxyl-terminated polyurethanes.

Similar to the preparation of isocyanate-terminated polyurethanes, supra, isocyanato-terminated polyureas and polyurethaneureas containing one or more urethane linkages can be prepared by reacting one or more primary and/or secondary amine-terminated polymers or mixtures of one or more such polymers with one or more polyols with polyisocyanate. Silylation of isocyanate-terminated polyureas and polyurethaneureas can be carried out with isocyanate-reactive silanes such as described above in connection with the silylation of the isocyanate-terminated polyurethanes, supra.

Moisture-Curable Silylated Resins Obtained from Unsaturated Functional Group Containing Polymer Useful alkoxysilyl-containing non-silicone resins include those obtained by the catalyzed hydrosilylation of a polymer containing at least one unsaturated functional group by a hydrosilane (also referred to as a hydridosilane).

The unsaturated polymer is generally not limited but must contain at least one site of unsaturation. Examples of suitable polymers containing an unsaturated site include, but are not limited to, unsaturated polyethers such as allyl-capped polyethers, vinyl functionalized polyethers or methylallyl-capped polyethers; and polymers derived from unsaturated monomer such as terminally unsaturated amines; alkynes; $C_2$-$C_{45}$ olefins, such as alpha olefins; unsaturated epoxides such as allyl glycidyl ether and vinyl cyclohexene-oxide; terminally unsaturated acrylates or methyl acrylates; unsaturated aryl ethers; unsaturated aromatic hydrocarbons; unsaturated cycloalkanes such as trivinyl cyclohexane; vinyl-functionalized polymer or oligomer, vinyl-functionalized and/or terminally unsaturated allyl-functionalized silane and/or vinyl-functionalized silicones; unsaturated fatty acids; unsaturated fatty esters; or combinations of two or more thereof. Illustrative examples of such unsaturated polymers include, but are not limited to, those obtained from the polymerization or copolymerization of ethylene, propylene, isobutylene, 1-hexene, 1-octene, 1-octadecene, styrene, alpha-methylstyrene, cyclopentene, norbornene, 1,5-hexadiene, norbornadiene, vinylcyclohexene, allyl alcohol, allyl-terminated polyethyleneglycol, allylacrylate, allyl methacrylate, allyl glycidyl ether, allyl-terminated isocyanate-or acrylate prepolymers, butadiene, allylamine, methallyl amine, acetylene, phenylacetylene, and the like.

The hydridosilane useful in the present invention is of the general Formula (VI):

$$HSiR^{15}_{3-a}X^6_a \qquad (VI)$$

wherein each $R^{15}$ is independently an alkyl group having from 1 to 6 carbon atoms, a phenyl group or an arenyl group having from about 7 to about 12 carbon atoms; each $X^6$ is independently an alkoxy group having from 1 to about 6 carbon atoms, or an alkoxy group having from 1 to about 6 carbon atoms and at least one ether or ester functional group; and a is 1, 2 or 3. Representative and non-limiting examples of hydridosilanes include trimethoxyhydridosilane, triethoxyhydridosilane, methyldimethoxyhydridosilane and methyldiethoxyhydridosilane.

Polymers Containing Pendant Alkoxysilyl Functionality

Further illustrative of alkoxysilyl-containing non-silicone resins are acrylosilane polymers derived from the polymerization in a known manner of one or more ethylenically unsaturated alkoxysilanes such as the acrylate alkoxysilanes and vinylalkoxysilanes and copolymerization of such polymers with one or more ethylenically unsaturated non-silane monomers.

Suitable ethylenically unsaturated silanes include acrylate alkoxysilanes such as gamma acryloxypropyltrimethoxysilane and methacrylatoalkoxysilanes such as gamma methacryloxypropyltrimethoxysilane, and gamma-methacryloxypropyltris(2-methoxyethoxy)silane and vinylalkoxysilanes, such as vinyltrimethoxysilane, vinyltriethoxysilane and vinyltris(2-methoxyethoxy)silane.

Suitable ethylenically unsaturated non-silane containing monomers are alkyl acrylates, alkyl methacrylates where the alkyl groups have from 1 to about 12 carbon atoms such as methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like, methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used such as, e.g., trimethylcyclohexyl methacrylate, trimethylcyclohexyl acrylate, iso-butyl methacrylate, t-butyl cyclohexyl acrylate, or t-butyl cyclohexyl methacrylate. Aryl acrylate and aryl methacrylates also can be used, e.g., such as benzyl acrylate and benzyl methacrylate, isobornyl methacrylate, isobornyl acrylate, and mixtures thereof.

In one embodiment, the level of incorporation of alkoxysilane-containing polymer(s) (a) in the moisture-curable composition of the invention can advantageously range from about 5 to about 98, more preferably from about 20 to about 70, and most preferably from about 25 to about 50 weight percent of the composition.

(2) Non-Tin Cure Catalyst (b)

(i) Organotitanium Compound

As previously indicated, the organotitanium compound component of non-tin cure catalyst (b) is advantageously one that is also useful for preparing alkoxysilyl-containing polymers (a), e.g., as described above. In this embodiment of the invention, such organotitanium compounds will be allowed to remain in the alkoxysilyl-containing polymer (a) product, and completion of the preparation of non-tin cure catalyst (b) merely requires the addition of compound(s) containing a (—)$_2$N—C═N— group, which includes amidine compounds, to the essentially dry silylated resin (or dry formulated products containing same) prior to effecting curing. Essentially dry means the presence of less than about 200, preferably less than about 50, parts per million (ppm) water. A procedure for determining the amount of water in the essentially dry silylated resin or dry formulated products containing same is ASTM D6869-03(2011), Standard Test Method for Coulometric and Volumetric Determination of Moisture in Plastics Using the Karly Fischer Reaction (the Reaction of Iodine with Water). Suitable organotitanium compounds for use in preparing non-tin curing catalyst (b) include the titanium carboxylates, alkoxides, acetylacetonates, alkylsulfonates, arylsulfonates, dialkyphosphates, dialkylpyrophosphates, ketoesters, ketoacids and diketones and combinations thereof.

In some embodiments, the organotitanium compound is a carboxylate of a carboxylic acid of general Formula (VII):

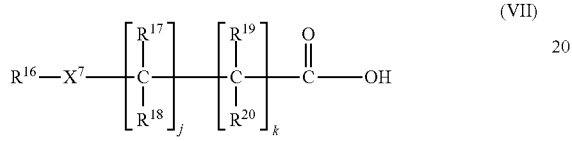

(VII)

wherein
$R^{16}$ is hydrogen, $C_1$-$C_{25}$ alkyl, $C_2$-$C_{25}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, $C_7$-$C_9$ phenylalkyl which is unsubstituted or substituted on the phenyl ring by $C_1$-$C_4$ alkyl, $COR^{16}$, a 5- or 6-membered heterocyclic ring which is unsubstituted or substituted by $C_1$-$C_4$ alkyl, $C_1$-$C_4$ alkoxy, halogen or carboxyl, a 5- or 6-membered heterocyclic ring which is benzo-fused and is unsubstituted or substituted by $C_1$-$C_4$ alkyl, $C_1$-$C_4$ alkoxy, halogen or carboxyl, or a radical of one of the following formulas:

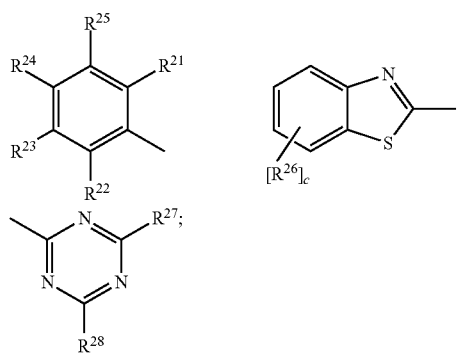

wherein:
$R^{21}$, $R^{22}$, $R^{23}$, $R^{24}$ and $R^{25}$ are independently hydrogen, hydroxyl, halogen, nitro, cyano, $CF_3$, —$COR^{29}$, $C_1$-$C_{25}$ alkyl, $C_2$-$C_{25}$ alkyl which is interrupted by oxygen or sulfur, $C_1$-$C_{25}$ haloalkyl, $C_1$-$C_{18}$ alkoxy, $C_2$-$C_{18}$ alkoxy which is interrupted by oxygen or sulfur, $C_1$-$C_{18}$ alkylthio, $C_2$-$C_{24}$ alkenyl, $C_5$-$C_{15}$ cycloalkyl which is unsubstituted or substituted by $C_1$-$C_4$ alkyl, $C_5$-$C_{15}$ cycloalkenyl which is unsubstituted or substituted by $C_1$-$C_4$ alkyl, phenyl or naphthyl which is unsubstituted or substituted by $C_1$-$C_4$ alkyl, $C_7$-$C_9$ phenylalkyl which is unsubstituted or substituted on the phenyl ring by $C_1$-$C_4$ alkyl, $C_{10}$-$C_{12}$ naphthylalkyl which is unsubstituted or substituted on the naphthyl ring system by $C_1$-$C_4$ alkyl, phenoxy or naphthoxy which is unsubstituted or substituted by $C_1$-$C_4$ alkyl, $C_7$-$C_9$ phenylalkoxy which is unsubstituted or substituted on the phenyl ring by $C_1$-$C_4$ alkyl, $C_{10}$-$C_{12}$ naphthylalkoxy which is unsubstituted or substituted on the naphthyl ring system by $C_1$-$C_4$ alkyl, or $R^{22}$ and $R^{23}$, $R^{23}$ and $R^{24}$, $R^{24}$ and $R^{25}$, or $R^{21}$ and $R^{25}$ together with the carbon atoms to which they are attached form an unsubstituted or $C_1$-$C_4$ alkyl-, halogen- or $C_1$-$C_4$ alkoxy-substituted benzo ring, with the proviso that at least one of the radicals $R^{21}$, $R^{22}$, $R^{23}$, $R^{24}$ and $R^{25}$ is hydrogen;

$R^{26}$ is hydroxyl, halogen, nitro, cyano, $CF_3$, $C_1$-$C_{25}$ alkyl, $C_2$-$C_{25}$ alkyl which is interrupted by oxygen or sulfur $C_1$-$C_{25}$ haloalkyl, $C_1$-$C_{18}$ alkoxy, $C_2$-$C_{18}$ alkoxy which is interrupted by oxygen or sulfur; $C_1$-$C_{18}$ alkylthio or $C_2$-$C_{24}$ alkenyl;

$R^{27}$ and $R^{28}$ are independently hydrogen, $C_1$-$C_{25}$ alkyl, $C_1$-$C_{18}$ alkoxy or —Y—$(CH_2)_s COR^{29}$ wherein $R^{29}$ is hydroxyl, $C_1$-$C_{18}$ alkoxy, $C_2$-$C_{18}$ alkoxy which is interrupted by oxygen or sulfur,

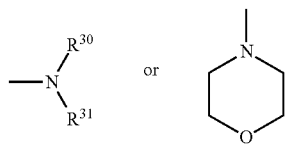

$R^{30}$ and $R^{31}$ are independently hydrogen, $C_1$-$C_{25}$ alkyl, $C_3$-$C_{25}$ alkyl which is interrupted by oxygen or sulfur, $C_2$-$C_{24}$ alkenyl, $C_5$-$C_{15}$ cycloalkyl which is unsubstituted or substituted by $C_1$-$C_4$ alkyl, phenyl or naphthyl which is unsubstituted or substituted by $C_1$-$C_4$ alkyl;

$R^{17}$, $R^{18}$, $R^{19}$ and $R^{20}$ are independently hydrogen, hydroxyl, $C_1$-$C_{18}$ alkoxy, $C_2$-$C_{18}$ alkoxy which is interrupted by oxygen or sulfur, $C_1$-$C_{25}$ alkyl, $C_2$-$C_{25}$ alkyl which is interrupted by oxygen or sulfur, $C_2$-$C_{24}$ alkenyl, $C_5$-$C_{15}$ cycloalkyl which is unsubstituted or substituted by $C_1$-$C_4$ alkyl, $C_5$-$C_{15}$ cycloalkenyl which is unsubstituted or substituted by $C_1$-$C_4$ alkyl, phenyl or naphthyl which is unsubstituted or substituted by $C_1$-$C_4$ alkyl, $C_7$-$C_9$ phenylalkyl which is unsubstituted or substituted on the phenyl ring by $C_1$-$C_4$ alkyl, $C_{10}$-$C_{12}$ naphthylalkyl which is unsubstituted or substituted on the naphthyl ring system by $C_1$-$C_4$ alkyl, or are —$COR^{29}$, with the proviso that, if one of the radicals $R^{17}$, $R^{18}$, $R^{19}$ and $R^{20}$ is hydroxyl, the other radical attached to the same carbon atom is other than hydroxyl, or $R^{17}$ and $R^{18}$ or $R^{19}$ and $R^{20}$ together with the carbon atom to which they are attached form an unsubstituted or $C_1$-$C_4$ alkyl-substituted $C_5$-$C_{12}$ cycloalkylidene ring;

$X^7$ is a direct bond, oxygen, sulfur, C(O), $C_1$-$C_{18}$ alkylene, $C_2$-$C_{18}$ alkylene which is interrupted by oxygen or sulfur; $C_2$-$C_{18}$ alkenylene, $C_2$-$C_{18}$ alkynylene, $C_2$-$C_{20}$ alkylidene, $C_7$-$C_{20}$ phenylalkylidene or $C_5$-$C_8$ cycloalkylene, with the proviso that, if j and k are 0, $X^7$ is other than oxygen and sulfur;

Y is oxygen or —$R^{32}$—N(—)$_2$ in which $R^{32}$ is hydrogen or $C_1$-$C_8$ alkyl; and, j and k are independently 0 to about 10, c is from 0 to 4 and, s is from 1 to about 8.

In one embodiment, the organotitanium compound has the general Formula (VIII):

$$Ti^{IV}L^1_4 \qquad (VIII)$$

wherein each occurrence of $L^1$ is independently an organo group containing from 1 to 20 carbon atoms and at least one lone pair of electrons on an oxygen, nitrogen or sulfur atom, in which the lone pair of electrons on an oxygen, nitrogen or sulfur atom are capable of forming an ionic bond or a dative bond with the $Ti^{IV}$, and optionally, wherein two or more $L^1$ groups can be linked together through a covalent bond between a carbon atom on each of the $L^1$ groups. $L^1$ include alkoxides, carboxylates, enolates, depronated amines and mercaptides. When the $L^1$ group form an ionic bond with $Ti^{IV}$, then organtitanium compound is a salt. When the $L^1$ group form a dative bond with $Ti^{IV}$, then organtitanium compound is a complex.

Representative non-limiting examples of $L^1$ include alkoxides, such as methoxide, ethoxide, proproxide, isoproproxide, butoxide, isobutoxide, sec-butoxide, and tert-butoxide; carboxylates, such as acetate, propanoate, isopropanoate, butanoate, hexanoate, phenoxide and 2-ethylhexanoate; enolates, such as ethenolate, 1-propenolate, 2-propenolate, 1-butenolate, 2-butenolate, 1-pentenolate, 2-pentnolate and 4-oxo-2-pentenolate; depronated amines, such as deprotonated methyl amine, deprotonated dimethyl amine, deprotonated butyl amine and deprotonated methyl butyl amine; mercaptide, such as methyl mercaptide, ethyl mercaptide, propyl mercaptide, hexyl mercaptide and octyl mercaptide.

Representative non-limiting examples of organotitanium compounds include tetra ethyl titanate (Borica: TYTAN™ ET), tetra iso-propyl titanate (Borica: TYTAN™ TIPT), propylbutyl titanate (Borica: TYTAN™ BIP), polybutyl titanate (Borica: TYTAN™ PBT), tetra n-butyl titanate (Borica: TYTAN™ TNBT), tetra n-propyl titanate (Borica: TYTAN™ TNPT), tetra 2-ethylhexyl titanate (Borica: TYTAN™ EHT), di-iso-propoxyl titanium chelate (ethylacetoacetate titanate) (Borica: TYTAN™ S2), di-iso-butoxy titanium chelate ethylacetoacetate titanate (Borica: TYTAN™ S6), proprietary titanium chelates (Dorf Ketal: Tyzor® GBA, Tyzor® GBO), titanium acetylacetonate (Borica: TYTAN™ TAA, TYTAN™ X85; Dorf Ketal: Tyzor® AA-75, Tyzor® AA, Tyzor® AA-65, Tyzor® AA-105), titanium acetylacetonate in ethanol and isopropanol (Borica: TYTAN™ AP20, TYTAN™ AP40), triethanolamine titanate (Borica: TYTAN™ TET), alkanolamine titanates (Dorf Ketal: Tyzor® TE, Tyzor® TEP, Tyzor® TEAZ) and titanium phosphate complex (Borica: TYTAN™ AP100; Dorf Ketal: Tyzor® IAM).

(ii) Compound Containing (—)$_2$N—C=N— Linkage

In certain embodiments, the (—)$_2$N—C=N— linkage-containing compound which is present in non-tin curing catalyst (b) is an amidine of one or more of Formulas (IX)-(XVI):

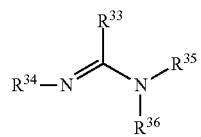
(IX)

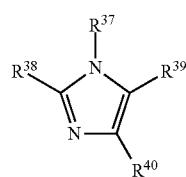
(X)

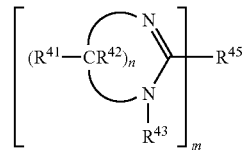
(XI)

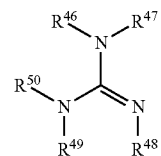
(XII)

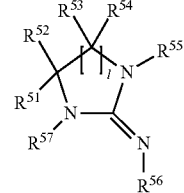
(XIII)

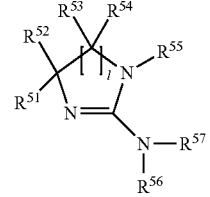
(XIV)

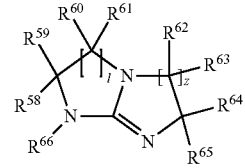
(XV)

(XVI)

wherein:

$R^{33}$ is hydrogen, $C_1$-$C_{36}$ alkyl, $C_2$-$C_{25}$ alkyl interrupted by oxygen or sulfur, $C_2$-$C_{24}$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_3$-$C_{26}$ polycycloalkyl, $C_7$-$C_9$ phenylalkyl which is unsubstituted or substituted on the phenyl ring by $C_1$-$C_4$ alkyl, an amine group which is optionally substituted, or a hydroxyl group which is optionally etherified with a hydrocarbyl group having up to 8 carbon atoms;

$R^{34}$ and $R^{35}$ are each independently hydrogen, $C_1$-$C_{25}$ alkyl, $C_2$-$C_{25}$ alkyl interrupted by oxygen or sulfur, $C_2$-$C_2$ alkenyl, $C_4$-$C_{15}$ cycloalkyl which is unsubstituted or substituted by $C_1$-$C_4$ allyl and/or carboxyl, $C_5$-$C_{15}$ cycloalkenyl which is unsubstituted or substituted by $C_1$-$C_4$ alkyl and/or carboxyl, $C_{13}$-$C_{26}$ polycycloalkyl, or $C_7$-$C_9$ phenylalkyl which is unsubstituted or substituted on the phenyl ring by $C_1$-$C_4$ alkyl, or $R^{34}$ and $R^{35}$ are joined to one another by an (—)$_2$N=C—N— linkage to form a heterocyclic ring with one or more hetero atoms or a fused bicyclic ring with one or more heteroatoms;

R$^3$ is hydrogen, C$_1$-C$_{36}$ alkyl, C$_1$-C$_{36}$ alkyl interrupted by oxygen or sulfur, C$_2$-C$_{24}$ alkenyl, C$_4$-C$_{15}$ cycloalkyl which is unsubstituted or substituted by C$_1$-C$_4$ allyl and/or carboxyl, C$_5$-C$_{15}$ cycloalkenyl which is unsubstituted or substituted by C$_1$-C$_4$ alkyl and/or carboxyl, C$_1$3 -C$_{26}$ polycycloalkyl, C$_7$-C$_9$ phenylalkyl which is unsubstituted or substituted on the phenyl ring by C$_1$-C$_4$ alkyl, or a hydroxyl group which can be optionally etherified with a hydrocarbyl group having up to about 8 carbon atoms;

R$^{37}$, R$^{38}$, R$^{39}$ and R$^{40}$ are independently hydrogen, alkyl, substituted alkyl, hydroxyalkyl, aryl, aralkyl, cycloalkyl, heterocyclyl, ether, thioether, halogen, —N(R)$_2$, polyethylene polyamine, nitro, keto, ester, or carbonamide, optionally alkyl substituted with alkyl, substituted alkyl, hydroxyalkyl, aryl, aralkyl, cycloalkyl, heterocyclyl, ether, thioether, halogen, —N(R)$_2$, polyethylene polyamine, nitro, keto or ester;

R$^{41}$, R$^{42}$ and R$^{43}$ are independently hydrogen, alkyl, alkenyl or alkoxy of from 1 to about 36 carbons, cycloalkyl of from 5 to about 32 carbons, alkylamino of from 1 to about 36 carbon atoms, phenyl, hydroxyalkyl, hydroxycycloalkyl of from 1 to about 20 carbon atoms, methoxyalkyl of from 1 to about 20 carbon atoms, aralkyl of from 7 to 9 carbon atoms, wherein the aryl group of the aralkyl is optionally further substituted by alkyl of from 1 to about 36 carbon atoms, ether, thioether, halogen, —N(R$^{44}$)$_2$, polyethylene polyamines, nitro groups, keto groups, ester groups, or carbonamide groups, and the alkyl group of the aralkyl is optionally further substituted with alkyl, substituted alkyl, hydroxyalkyl, aryl, aralkyl, cycloalkyl, heterocyclics, ether, thioether, halogen, —N(R$^{44}$)$_2$, polyethylene polyamines, nitro groups, keto groups or ester groups and wherein each R$^{44}$ is independently alkyl, alkylene, aryl, aralkyl, cycloalkyl or heterocyclic radical, optionally substituted with halogen, nitro, alkyl, alkoxy or amino;

R$^{45}$ is hydrogen or an organic group;

R$^{46}$—R$^{66}$ are independently hydrogen, alkyl, cycloalkyl, aryl, aromatic, organometallic, a polymeric structure or together can form a cycloalkyl, aryl, or an aromatic structure; and, m is 1 or 2, n is 2 or 3, 1 is 1, 2 or 3 and z is 1, 2 or 3.

Compounds containing the (—)$_2$N—C=N— linkage that may be employed in the preparation of non-tin cure catalyst (b) are N'-cyclohexyl-N,N-dimethylformamidine, N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl) morpholine, N-(.a-1pha.-(decylimino ethyl)ethyl) pyrrolidine, N'-decyl-N,N-dimethylformamidine, N'-dodecyl-N,N-dimethylformamidine, N'-cyclohexyl-N,N-acetamidine, pentamethylguanidine, tetramethylguanidine, heptamethylisobiguanide, 1,5-diazabicyclo(4.3.0) none-5-ene, 1,8-diazabicyclo(5.4.0) undec-7-ene, 1,4-diazabicyclo(3.3.0) oct-4-ene, 2-methyl-1,5-diazabicyclo(4.3.0) none-5-ene, 2,7,8-trimethyl-1,5-diazabicyclo(4.3.0) none-5-ene, 2-butyl-1,5-diazabicyclo(4.3.0) none-5-ene, 1,9-diazabicyclo(6.5.0) tridec-8-ene, N-(2-hydroxyethyl)imidazole, N-(3-Aminopropyl)imidazole, 4-(hydroxymethyl) imidazole, 1-(tert-butoxycarbonyl)imidazole, imidazole-4-propionic acid, 4-carboxylmidazole, 1-butylimidazole, 2-methyl-4-imidazolecarboxylic acid, 4-formyl imidazole, 1-(ethoxycarbonyl)imidazole, reaction product of propylene oxide with imidazole and 2-methyl imidazole, 4-(hydroxymethyl) imidazole hydrochloride, copolymer of 1-chloro-2,3-epoxypropane and imidazole, 1(p-toluenesulfonyl)imidazole, 1,1'-carbonylbisimidazole, 1-(2-cyanoethyl)-2-ethyl-4-methylimidazole, 2-phenyl-2-imidazoline pyromellitate, 4-(hydroxymethyl) imidazole picrate, reaction product of 2-propenoic acid with 4,5-dihydro-2-nonyl-1H-imidazole-1-ethanol and 2-heptyl-4,5-dihydro-1H-imidazole-1-ethanol, disodium salts, 1-(cyanoethyl)-2-undecylimidazole trimellitate, 1-(2-hydroxypropyl)imidazole formate, sodium imidazolate, silver imidazolate, 1H-imidazole-1-ethanol, 2-(8Z)-8-heptadecenyl-4,5-dihydro, 1H-imidazole-1-ethanol, 2-(8Z)-8-heptadecenyl-4,5-dihydro, monoacetate salt, 1H-imidazole-1-ethanol, -4,5-dihydro,-2-(9Z)-9-octadecenyl, 1H-imidazole, 4,5-dihydro,-2-(9Z)-9-octadecenyl, oleyl hydroxyethyl imidazoline, 1H-imidazole-1-ethanol, 4,5-dihydro-2-undecyl-, 1H-imidazole-1-ethanol, 2(-8-heptadecenyl)-4,5-dihydro, 1-(2-hydroxyethyl)-2-tall oil alkyl-2-imidazoline, azelaic acid salt, 1H-imidazole-1-ethanol, 2-heptadecyl-4,5-dihydro, 1H-imidazole-1-ethanol, 2-nonyl-4,5-dihydro, 1H-imidazole-1-ethanol, 4,5-dihydro-2-C$_{15-17}$-unsaturated alkyl derivatives, 1H-imidazole-1-ethanol, 4,5-dihydro-2-norcoco alkyl derivatives, 1H-imidazole-1-ethanol, 4,5-dihydro-2-nortall-oil alkyl derivatives, reaction product of 4,5-dihydro-2-nonyl 1H-imidazole-1-ethanol, and 4,5-dihydro-2-heptyl 1H-imidazole-1-ethanol with 2-propenoic acid, 1-propane sulfonic acid, 3-chloro-2-hydroxy-mono sodium salt reaction products with 2-(8Z)-8-heptadecenyl-4,5-dihydro 1H-imidazole-1-ethanol, chloroacetic acid sodium salt reaction products with 1H-imidazole-1-ethanol, 4,5-dihydro-2-norcoco alkyl derivatives, and sodium hydroxide, 2-(8-heptadecenyl)-4,5-dihydro 1H-imidazole-1-ethanamine, or the 9-octadecenoic acid compound with 2-(8-heptadecenyl)-4,5-dihydro 1H-imidazole-1-ethanamine.

In some embodiments, compounds containing the (—)$_2$N—C=N— linkage for inclusion in non-tin cure catalyst (b) include 1,8-diazabicyclo[5.4.0]undec-7-ene (DBU), 1,5-diazabicyclo[4.3.0]non-5-ene and 1,1,3,3-tetramethylguanidine.

In one embodiment, the non-tin cure catalyst (b) contains from about from about 10 to about 90 weight percent, more specifically, from about 25 to about 75, and still more specifically from about 40 to about 60, weight percent organotitanium compound(s), the balance of cure catalyst (b) being made up of the compound(s) containing the N—C=N group.

Non-tin cure catalyst (b) may be prepared by combining the desired amounts of organotitanium compound(s) and compound(s) containing a (—)$_2$N—C=N— linkage in a suitable solvent system, e.g., an alcohol such as methanol, ethanol, propanol, isopropanol, and the like, to form a solution, e.g., an about 40-60 weight percent solution. The components of the catalyst may be combined below, at or above ambient temperature provided a clear solution is ultimately obtained. In one embodiment, the organotitanium compound(s) and the (—)$_2$N—C=N— linkage-containing compound(s) are mixed together in the selected organic solvent(s) followed by heating under continuous stirring for from about 0.5 to about 4 hours or until the mixture becomes a clear solution. Depending on the procedure employed for combining the organotitanium compound(s) and the (—)$_2$N—C=N— linkage-containing compound(s), non-tin cure catalyst (b) may contain a mechanical mixture of these components and/or a complex thereof.

Non-tin cure catalyst (b) is present in the moisture-curable composition herein in at least a catalytic curing-effective amount. In most cases, acceptable curing rates, e.g., skin over time (SOT) rates, can be achieved with moisture-curable compositions containing from about 0.01 to about 30, more specifically from about 1 to about 20, and still more specifically from about 5 to 15, weight percent curing catalyst (b) based on the total weight of alkoxysilyl-containing polymer (a).

(3) Optional Mercapto-Functional Silicon Compound (c)

One or more mercapto-functional silicon compounds may advantageously be incorporated in the moisture-curable composition herein where they function as adhesion promoters. Illustrative of the mercapto-functional silanes are those disclosed in U.S. Pat. Nos. 7,368,584, 7,560,583 and 7,786,200 and the sulfur-containing silanes disclosed in U.S. Pat. No. 7,919,650, the entire contents of each of which is incorporated by reference herein.

The amount of optional mercapto-functional silicon compound (c) incorporated in the moisture-curable composition herein can vary widely, e.g., from about 0.01 to about 10, and particularly from about 0.1 to about 2, more particularly from about 0.5 to about 1.0 weight percent based on the entire weight of the composition.

In one particular embodiment, the mercapto-functional silicon compound has at least one of general Formulas (XVII) and (XVIII):

$$HSG^2SiZ^\theta X^8 \qquad (XVII)$$

$$[HSG^2SiZ^\theta Z^\beta]_t[HSG^3SiZ^\beta{}_3]_u[HSG^4SiZ^\beta{}_2X^8]_v [[HSG^5SiZ^\beta X^8{}_2]_w \qquad (XVIII)$$

wherein:

each occurrence of $G^2$, $G^3$, $G^4$ and $G^5$ is independently a hydrocarbylene group containing from 1 to 30 carbon atoms derived by substitution of a hydrogen on alkyl, cycloalkyl, alkenyl, aryl, or aralkyl, more specifically a straight or branched chain alkylene group of from 1 to about 6 carbon atoms, even more specifically from 1 to 3 carbon atoms and still more specifically 3 carbon atoms;

each occurrence of $Z^\beta$, which forms a bridging structure between two silicon atoms, is independently a [—O($R^{67}CR^{67}$)$_g$O—]$_{0.5}$ group paired with a different Si[—O($R^{67}CR^{67}$)$_g$O—]$_{0.5}$ group to form a bridging group, Si[—O($R^{67}CR^{67}$)$_g$O—]Si, in which each occurrence of $R^{67}$ is independently selected from the group consisting of hydrogen, straight alkyl, branched alkyl, cycloalkyl, alkenyl, aryl and aralkyl containing up to about 18 carbon atoms and g is from 2 to about 15, and more specifically each occurrence of $R^{67}$ is independently selected from the group consisting of hydrogen and a straight or branched chain alkyl group of from 1 to about 6 carbon atoms and g is from 2 to about 6, and even more specifically, each occurrence of $R^{67}$ is independently selected from the group consisting of hydrogen and a straight or branched chain alkyl group of from 1 to 3 carbon atoms and g is an integer of from 2 to 4, and still more specifically, each occurrence of $R^{67}$ is independently selected from the group consisting of hydrogen and a straight chain alkyl group 1 or 2 carbon atoms and with the proviso that at least one $R^{67}$ is an alkyl group and g is an integer of 2 or 3;

each occurrence of $Z^\theta$, which forms a cyclic structure with a silicon atom, is independently —O($R^{67}CR^{67}$)O— in which each occurrence of $R^{67}$ is independently selected from the group consisting of hydrogen, straight alkyl, branched alkyl, cycloalkyl, alkenyl, aryl and aralkyl containing up to 18 carbon atoms and g is 2 to about 15, and more specifically each occurrence of $R^{67}$ is independently selected from the group consisting of hydrogen and a straight or branched chain alkyl group of from 1 to about 6 carbon atoms and g is 2 to about 6, and even more specifically each occurrence of $R^{67}$ is independently selected from the group consisting of hydrogen and a straight or branched chain alkyl group from 1 to 3 carbon atoms and g is from 2 to 4, and still more specifically each occurrence of $R^{67}$ is independently selected from the group consisting of hydrogen and a straight chain alkyl group of 1 or 2 carbon atoms and with the proviso that at least one $R^{67}$ is an alkyl group and g is 2 or 3;

each occurrence of X is independently —$OR^{68}$ wherein each occurrence of $R^{68}$ is independently selected from the group consisting of hydrogen, straight alkyl, branched alkyl, cycloalkyl, alkenyl, aryl and aralkyl containing up to about 18 carbon atoms; and, t is from 0 to about 20, specifically from 0 to 5 and more specifically from 0 to 2; u is from 0 to about 18, specifically from 0 to 4, more specifically from 0 to 2 and still more specifically 1 or 2; v is specifically from 0 to about 20, specifically from 0 to 5, even more specifically from 0 to 2 and still more specifically 1 or 2; w is from 0 to about 20, specifically from 0 to 5 and even more specifically from 0 to 2; with the proviso that for Formula (XVII), t+u+v+w is equal to or greater than 2.

In other embodiments, t is from 0 to 2, u is from 0 to 2, v is from 0 to 2 and w is 0 to 2, specifically, t is from 2 to 4, u is from 0 to 2, v is from 0 to 2 and w is 0, more specifically, t is 0, u is from 0 to 2, v is from 0 to 2 and w is 2 to 4, and more specifically, t is 2, u is 0, v is 0 and w is 0, and still more specifically, t is 0, u is 0, v is 0 and w is 2.

In other embodiments, each of $G^2$, $G^3$, $G^4$ and $G^5$ is independently a divalent straight or branched chain alkylene group of from 1 to about 6 carbon atoms, specifically from 1 to 4 carbon atoms and more specifically 2 or 3 carbon atoms.

In other embodiments, at least one $G^2$, $G^3$, $G^4$ and $G^5$ group is different from the other $G^2$, $G^3$, $G^4$ and $G^5$ group and each of $G^2$, $G^3$, $G^4$ and $G^5$ independently is a hydrocarbylene group containing from 1 to about 30 carbon atoms, specifically a straight or branched chain alkylene group of from 1 to about 6 carbon atoms, more specifically a straight or branched chain alkylene group of from 1 to 4 carbon atoms and still more specifically a straight chain alkylene group of 2 or 3 carbon atoms.

(4) Other Optional Components (d)

The moisture-curable composition of the invention, in addition to its alkoxysilane-terminated polymer component (a), cure catalyst component (b) and optional mercapto-functional silicon compound (c), may further include one or more optional components (d), e.g., any of those materials commonly included in moisture-curable coatings, sealants and adhesives, in known and conventional amounts.

For example, such optional components comprising component (d) can include organic and inorganic compounds that contribute to the processing, flexibility and/or curing of alkoxysilyl-containing polymers and/or their cured properties. Optional components include organic solvent, polysiloxane, isocyanate-reactive scavenging agent, water scavenger agent, desiccant, non-silicon-based epoxy hardener, surfactant, colorant, plasticizer, extender, filler, reinforcing agent, adhesion promoter, organic resin modifier, UV stabilizer, color stabilizer, wetting agent, flow and leveling additive, thixotrope, defoamer, and the like.

Organic solvents can be used to lower the viscosity and improve the flow properties of the uncured compositions which are especially useful when the composition is to be used as a coating. A variety of solvents may be mentioned as exemplary, e.g., alcohols, glycols, triols, polyols, glycol ethers, esters, ketones, hydrocarbon, and the like.

Representative and non-limiting examples of specific solvents include mono-alcohols, such as methanol, ethanol, 1-propanol, 2-propanol (i-propanol), 2-methyl-1-propanol (i-butanol), 2-methyl-2-propanol (tert-butanol), 1-butanol, 2-butanol, 2-methyl-1-butanol, 2-methyl-2-butanol, 2,2-dimethyl-1-propanol, 1-pentanol, 2-pentanol, 4-methyl-2-pentanol; glycols such are propylene glycol, 1,3-butanediol, 1,4-butane diol, 2-methyl-1,3-propanediol, 2-methyl-2,4-pentanediol (hexylene glycol), diethylene glycol, triethylene glycol, tetraethylene glycol, poly(ethylene glycol), dipropylene glycol, tripropylene glycol, poly(propylene glycol), 1,5-pentanediol, esterdiol 204, 2,2,4-trimethylpentanediol, 2-ethyl-1,3-hexanediol, glycerol, glycerol ethoxylate, glycerol ethoxylate-co-propoxylate triol, glycerol propoxylate, pentaerythritol; glycol ethers such as 1-methoxy-2-propanol (propylene glycol methyl ether), 1-ethoxy-2-propanol, 1-propoxy-2-propanol, 1-butoxy-2-propanol, 2-methoxyethanol, 2-ethoxyethanol, 2-propoxyethanol, 2-butoxyethanol, 2-(2-methoxyethoxyl)ethanol, 2-(2-ethoxyethoxyl)ethanol, 2-(2-propoxyethoxyl)ethanol, 2-(2-butoxyethoxyl)ethanol (butyl carbitol), di(propylene glycol) butyl ether, tri(ethylene glycol)monomethyl ether, tri(ethylene glycol)monoethyl ether, tri(ethylene glycol)monobutyl ether, poly(ethylene glycol) methyl ether, poly(ethylene glycol)dimethylether, poly(ethylene glycol-co-propylene glycol), poly(ethylene glycol-co-propylene glycol)monobutyl ether, poly(propylene glycol)monobutyl ether, di(propylene glycol) dimethylether, esters including methyl acetate, ethyl acetate, ethyl lactate, 2-methoxyethyl acetate, 2-ethoxyethyl acetate, 2-butoxyethyl acetate, 2-(2-methoxyethoxyl)ethyl acetate, 2-(2-ethoxyethoxyl)ethyl acetate, 2-(2-butoxyethoxyl)ethyl acetate, glycol diacetate, triethylene glycol diacetate, propylene glycol methyl ether acetate (1-methoxy-2-propenol acetate), propylene glycol ethyl ether acetate, ketones including acetone, methyl ethyl ketone, 2,4-pentane dione, diacetone alcohol and hydrocarbons including toluene, xylene, naptha, mineral spirits, hexane, heptane, cyclohexane and mixtures thereof.

In certain embodiments, the solvent(s) can be present in the moisture-curable composition of the invention in an amount ranging from 1 to about 80 percent by weight, advantageously from about 10 to about 30, and in some embodiments, from about 10 to about 25, percent by weight based on the total weight of the composition.

One or more surfactants may be used to aid in the wetting and leveling of the moisture-curable composition of the invention especially where the composition is to be used as a coating. Useful surfactants include nonionic, cationic, anionic, amphoteric and/or zwitterionic surfactants. The surfactants are typically hydrocarbon-based, silicone-based or fluorocarbon-based. Useful surfactants having short chain hydrophobes. Other useful surfactants include alkoxylates, especially ethoxylates, containing block copolymers including copolymers of ethylene oxide, propylene oxide, butylene oxide, and mixtures thereof, alkylarylalkoxylates, especially ethoxylates or propoxylates and their derivatives including alkyl phenol ethoxylate; arylarylalkoxylates, especially ethoxylates or propoxylates, and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and mixtures thereof.

Representative non-limiting examples of surfactants include alkyl acetylenic diols sold by Air Products under the trade name Surfonyl®, pyrrilodone-based surfactants sold by ISP under the trade name Surfadone-LP® 100, 2-ethyl hexyl sulfate, isodecyl alcohol ethoxylates sold by Rhodia under the trade name Rhodasurf® 530, ethylene diamine alkoxylates sold by BASF under the trade name Tetronics®, ethylene oxide/propylene oxide copolymers sold by BASF under the trade name Pluronics®, and diphenyl ether Gemini type surfactants sold by Dow Chemical Corporation under the trade name Dowfax®.

In general, the moisture-curable composition herein can contain optional surfactant(s) in an amount of from about 0.01 to about 5, and advantageously from about 0.05 to about 2, weight percent and in certain embodiments, from about 0.1 to about 1 weight percent based on the total weight of the composition.

The moisture-curable composition of the invention can include a colorant. As used herein, the term "colorant" means any substance that imparts color and/or other opacity and/or other visual effect to the polymer. The colorant can be added to the silylated polyurethane polymer composition in any suitable form such as discrete particles, dispersions, solutions, flakes, etc. A single colorant or a mixture of two or more colorants can be used in the moisture-curable composition of the invention.

Useful colorants include pigments, dyes and tints such as those used in the paint industry and/or listed in the Dry Color Manufacturers Association (DCMA), as well as special-effect materials. A useful type of colorant can be a finely divided solid powder that is insoluble but wettable under the conditions of use. A colorant can be organic or inorganic and can be agglomerated or non-agglomerated. Colorants can be added to the moisture-curable composition herein by use of a grinding vehicle such as an acrylic grinding vehicle the use of which is familiar to those skilled in the art.

Illustrative useful pigments and pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red, titanium dioxide, carbon black and mixtures thereof. The terms "pigment" and "colored filler" can be used interchangeably.

Useful dyes include, but are not limited to, those that are solvent and/or aqueous based such as phthalo green or blue, iron oxide, bismuth vanadate, anthraquinone, perylene, aluminum and quinacridone.

Useful tints include, but are not limited to, pigments dispersed in water-based or water miscible carriers such as Aqua-Chem® 896 commercially available from Degussa, Inc., Charisma Colorants® and Maxitoner Industrial Colorants® commercially available from Accurate Dispersions division of Eastman Chemical, Inc.

In general, the colorant can be present in the moisture-curable composition herein in any amount that is sufficient to impart the desired visual and/or color effect. The colorant can comprise from, e.g., from about 1 to about 65 weight percent of the silylated polyurethane polymer composition, such as from about 3 to about 40 weight percent or from about 5 to about 35 weight percent thereof based on the total weight of the composition.

The moisture-curable composition of the invention can include one or more fillers. The filler can be any inorganic or organic filler that reinforces and/or extends the composition. Useful fillers include, e.g., reinforcing fillers such as carbon black, fumed silica, precipitated silica, clays, talc, aluminum silicates, metal oxides and hydroxides, and extending fillers such as treated and untreated calcium carbonates, and the like. Fillers can be in the form of powders, particulates, aggregates, agglomerates, platelets, fibers, etc. In one embodiment, one or more fillers are combined with silane coupling agents.

To further improve the physical strength of a cured composition herein, reinforcing carbon black can be used as a main filler resulting in black or darkly colored silylated polyurethane polymer compositions. Several commercial grades of carbon black useful in this invention are commercially available such as the Corax® products from Degussa. To obtain a colorless/translucent moisture-curable composition, higher levels of fumed silica or precipitated silica can be used as the main filler to the exclusion of carbon black. The surface area of the filler can be more than 20 meters$^2$/gram.

Treated calcium carbonates having particle sizes from 0.07 microns to 4 microns are preferred fillers and are available under several trade names, such as: Ultra Pflex® and HiPflex® from Specialty Minerals; Winnofil® SPM and Winnofil® SPT from Zeneca Resins; Hubercarb®Qt, Hubercarb® 3 Qt and Hubercarb® W from Huber and Kotomite® from ECC; Omyabond® 520, Omyacarb® 3, Omyacarb® 5 from Omya, and the like. These fillers can be used either alone or in combination.

The optional fillers can be included in the moisture-curable composition herein in an amount of up to about 80 weight percent, advantageously in an amount of up to about 50 weight percent, and in certain embodiments, in an amount of from about 20 to about 50 weight percent based on the total weight of the composition.

The moisture-curable composition herein can optionally include one or more plasticizers. Exemplary plasticizers include phthalates, dipropylene and diethylene glycol dibenzoates and mixtures thereof epoxidized soybean oil, and the like. Useful commercial dioctyl and diisodecyl phthalates include Jayflex® DOP and Jayflex® DIDP from Exxon Chemical. Dibenzoate plasticizers are available as Benzoflex® 9-88, Benzoflex® 50 and Benzoflex® 400 from Velsicol Chemical Corporation; Mesamoll® from Lanxess. The optional plasticizer(s) can represent up to about 100 parts by weight per hundred parts of the moisture-curable composition with up to 40 parts by weight per hundred parts of the composition being preferred.

Optional thixotropes that may be incorporated in the moisture-curable composition of the invention include various castor waxes, fumed silica, treated clays and polyamides. Commercially available thixotropes include, e.g., Aerosil from Degussa, Cabo-Sil TS 720 from Cabot, Castorwax from CasChem, Thixatrol and Thixcin from Rheox, Crayvallac from Crayvalley Corp. and Dislon from King Industries.

In the case of silylated polyurethanes, the optional isocyanate-reactive scavenging agent is an agent possessing at least one active hydrogen and that reacts with isocyanate at a rate greater than that of undesired reactions that cause an increase in viscosity such as the further reaction of isocyanate with hydroxyl-terminated polymers if there is still hydroxyl present, reaction of isocyanate with urethane to form allophanate, reaction of isocyanate with urea to form biuret and reaction of the hydroxyl-terminated polymers with an alkoxysilyl group to generate an alcohol.

An isocyanate-reactive scavenging agent can be added to the reaction mixture of isocyanatosilane, hydroxyl-terminated polymer and optionally other ingredients, such as catalysts and non-protic solvents, at a desired point at or near the end of the silylation reaction. It is understood that for di- or polyisocyanate-extended polyols the hydroxyl-terminated polymer may contain residual isocyanate, either from partially reacted di- or polyisocyanate, or from unreacted di- or polyisocyanate. The residual isocyanate present in the silylated polyurethane polymer composition can come from the di- or polyisocyanate used to chain extend polyol (ii), or from the isocyanatosilane used to react with the hydroxyl-terminated polymer. The desired point for the addition of the isocyanate-reactive agent can be determined by the viscosity of the reaction mixture, or by some other method. Thus, the isocyanate-reactive scavenging agent is added to the reaction mixture at a particular viscosity depending on formulation and the desired properties of the final product. In one embodiment of the invention, the isocyanate-reactive scavenging agent is added to the reaction mixture at a viscosity range from about 1,000 cP to about 150,000 cP when measured at a temperature of 25° C., and in another embodiment of the invention from about 30,000 cP to about 75,000 cP when measured at a temperature of 25° C. In this manner, the isocyanate-reactive scavenging agent minimizes batch-to-batch variation of the final viscosity of the silylated polyurethane polymer composition.

Optional antioxidants can be added to the moisture-curable composition of the invention to provide protection against oxidative change. The quantities in which antioxidants can be used vary within wide limits, e.g., from about 0.01 to about 10 weight percent and, more particularly, from about 0.01 to about 3 weight percent, based on the weight of the composition.

A water scavenging agent can optionally be added to the moisture-curable composition herein to improve its package stability and to prevent premature curing. Useful water scavenging agents include alkoxysilanes, e.g., vinyltrimethoxysilane, methyltrimethoxysilane, and the like. The concentration of water scavenging agents can be in the range of from about 0 to about 5 weight percent based on the weight of the composition.

As an alternative or in addition to optional water scavenging agent, desiccant can optionally be added to the moisture-curable composition herein to improve its package stability and to prevent premature curing. Any known or conventional desiccant, e.g., silica gel, can be utilized for this purpose.

According to one embodiment of the invention, a color stabilizer can be added to moisture-curable composition to reduce its yellowing overtime. Representative non-limiting examples of color stabilizers include, e.g., triphenyl phosphite, diphenyl-alkyl phosphites, phenyl-dialkyl phosphites, tris(nonylphenyl)phosphite, trilauryl phosphite, trioctadecyl phosphite, distearyl-pentaerythritol diphosphite, tris(2,4-di-tert-butylphenyl)phosphite, diisodecyl pentaerythritol diphosphite, bis(2,4-di-tert-butylphenyl)-pentaerythritol diphosphite, bis(2,4-di-cumylphenyl)-pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, bis (2,4-di-tert-butyl-6-methylphenyl)-methyl phosphite, bis(2,4-di-tert-butyl-6-methylphenyl)-ethyl phosphite, 2,2',2"- nitrilo-[triethyltris(3,3',5,5'-tetra-tert-butyl-1,1'-biph-enyl-2,2'-diyl)phosphite] and 2-ethylhexyl(3,3',5,5'-tetra-tert-butyl-1,1'-biphenyl-2,2'-diyl)phosphite.

In one embodiment, the amount of color stabilizer used can vary from about 0.01 to about 3 weight percent and preferably from about 0.5 to about 2 weight percent, based on the weight of the moisture-curable composition.

In addition to, or in place of optional mercapto-functional silicon compound (c), supra, one or more other silane adhesion promoters may optionally be incorporated in the moisture-curable composition of the invention. Suitable such silane adhesion promoters include N-2-aminoethyl-3-aminopropyltriethoxysilane, gamma-aminopropyltriethoxysilane, gamma-aminopropyltrimethoxysilane, aminopropyltrimethoxysilane, bis-gamma-trimethoxysilypropyl)amine, N-phenyl-gamma-aminopropyltrimethoxysilane, triaminofunctionaltrimethoxysilane, gamma.-aminopropylmethyldiethoxysilane, gamma-aminopropylmethyldiethoxysilane, methacryloxypropyltrimethoxysilane, methylaminopropyltrimethoxysilane, gamma-glycidoxypropylethyldimethoxysilane, gamma-glycidoxypropyltrimethoxysilane, gamma-glycidoxyethyltrimethoxysilane, beta-(3,4-epoxycyclohexyl)propyltrimethoxysilane, trimethoxy(3-oxiranylmethoxypropyl)silane, dimethoxymethyl(3-oxiranylmethoxypropyl)silane, beta-(3,4-epoxycyclohexyl)ethylmethyldimethoxysilane, isocyanatopropyltriethoxysilane, isocyanatopropylmethyldimethoxysilane, beta-cyanoethyltrimethoxysilane, gamma-acryloxypropyltrimethoxysilane, gamma-methacryloxypropylmethyldimethoxysilane, 4-amino-3,3-dimethylbutyltrimethoxysilane, and N-ethyl-3-trimethoxysilyl-2-methylpropanamine, tris-(gamma-trimethoxysilyl)isocyanurate, and the like, and combinations thereof.

The total amount of optional mercapto-functional silicon compound(s) (c) and/or other optional adhesion promoter(s) incorporated in the moisture-curable composition herein can vary widely, e.g., from about 0.01 to about 10, and particularly from about 0.1 to about 2, weight percent based on the entire weight of the composition.

EXAMPLES (A) Preparation of Alkoxysilyl-Containing Polymers

Six alkoxysilyl-containing polymers, designated SPUR Resin A, SPUR Resin B, E-SPUR-1, E-SPUR-2, M-SPUR-3 and M-SPUR-4 were prepared for formulation as moisture-curable adhesives curable adhesive compositions for evaluation.

(1) SPUR Resin A: Silylated Polyurethane Having Triethoxysilyl Termination

Into a 2-liter three neck resin kettle were charged 1144 grams (0.1 mole) of dried polyoxypropylene diol and 5.50 grams of Irganox 1135 antioxidant (BASF) followed by heating to 60° C. under agitation and nitrogen protection. Thereafter, 10.20 grams (0.043 mole) of isophorone diisocyanate and 0.15 milliliter of a 10 weight percent solution of dibutyltin dilaurate in diethylene glycol dimethyl ether. After isotherm, the reaction temperature was raised to 80° C. The reaction proceeded under nitrogen protection and was monitored for increase in viscosity and depletion of NCO content. When the reaction reached a desired capping point, 28.26 grams (0.114 mole) of isocyanatopropyltriethoxysilane was added. The mixture reacted at the same temperature until the NCO reached near zero as determined by titration. Butanol (2 grams) was added and the reaction was allowed to cool. The silylated polyurethane resin product, designated SPUR A, had a viscosity of 72,300 cP at room temperature and no NCO peak was detected in the FTIR spectrum of the SPUR A product.

(2) SPUR Resin B: Silylated Polyurethane Polymer Having Trimethoxy Termination

Into a 2-liter three neck resin kettle were charged 800 grams (0.085 mole) of dried polyoxypropylene diol (0.085 mole) and 5 grams of Irganox 1135 antioxidant (BASF) followed by heating to 60° C. under agitation and nitrogen protection. Thereafter 9.50 grams (0.043 mole) of isophorone diisocyanate was added. After 10 minutes, 0.15 milliliter of a 10 weight percent solution of dibutyltin dilaurate in diethylene glycol dimethyl ether was added. After isotherm, the reaction temperature was heated to 80° C. The reaction proceeded under nitrogen protection and was monitored for increase in viscosity and depletion in NCO content. When the reaction reached a desired capping point, 19.59 grams (0.09 mole) of isocyanatopropyltrimethoxysilane was added. The mixture reacted at the same temperature until the NCO reached near zero as determined by titration. Methanol (0.2 grams) and 1.90 grams of vinyltrimethoxysilane were added, mixed and then cooled to room temperature. The silylated SPUR resin product, designated SPUR B, had a viscosity of 53,000 cP at room temperature and no NCO group was detected in FTIR spectrum of the SPUR B product.

(3) E-SPUR-1: Dimethyltin Mercaptide Catalyzed Preparation of Triethoxysilyl-Terminated Polyurethane Resin)

Into a 1 L resin kettle were charged 440 gram of dried hydroxy-terminated polypropylene oxide (0.024 mole, acquired under the tradename Acclaim 18200 from Covestro), and 2.2 grams of Irganox 1135. The kettle was heated up to 60° C. with stirring and $N_2$ protection. 3-Isocyanatopropyl triethoxysilane (1335 grams, 0.0518 mole of Silquest A-Link 25 from Momentive) was added and stirred. Ten minutes late, dimethyltin mercaptide (9 ppm of the Sn, acquired under the tradename Fomrez UL 22 from Momentive) was added to the mixture. The temperature of the kettle was slowly increased to 90° C., and maintained at this temperature until the NCO titer was reduced to near 0% by titration. The mixture was cooled. Ethanol (3.70 grams) was add to the mixture when the temperature dropped reached 80° C. The silylated polyurethane prepolymer had no NCO content detected by FTIR with a viscosity of approximately 31,000 centipoise.

(4) E-SPUR-2: Dibutyltin Dilaurate Catalyzed Preparation of Triethoxysilyl-Terminated Polyurethane Resin Into a 2 L resin kettle were charged 957.4 gram of dried hydroxy-terminated polypropylene oxide (0.0725 mole, acquired under the tradename Acclaim 12200N from Covestro) and 4.89 grams of Irganox 1135. The kettle was heated to 60° C. with stirring and $N_2$ protection. Isophorone diisocyanate (8.05 grams, 0.0363 mole acquired from Chovestro) was added and stirred for ten minutes. Dibutyltin dilaurate (5 ppm of the Sn, acquired under the tradename Fomrez SUL 4 from Momentive) was charged. The reaction mixture was maintained at 70-73° C., until the NCO content reduced near to 0% by titration. 3-Isocyanatopropyl triethoxysilane (6.62 grams, 0.0653 mole, acquired under the tradename of Silquest A-Link 25 from Momentive) was added. The temperature of the kettle was slowly increased to 90° C., and maintained at this level until the NCO was reduced to near 0% by titration. The reaction mixture was cooled to 80° C. and then 8.0 grams of ethanol was added. The silylated polyurethane prepolymer had no NCO content detected by FTIR with a viscosity of approximately 35,000 centipoise.

(5) M-SPUR-3: Titanium Ethyl Acetoacetate Catalyzed Preparation of Trimethoxysilyl-Terminated Polyurethane Resin (M-SPUR)

Into a 1 L resin kettle was charged 423 grams of dried hydroxy-terminated polypropylene oxide (0.0535 mole, acquired under the tradename HMBT 80 from Huangma Chemical) and 2.1 g of Irganox 1135. The kettle was heated to 60° C. with stirring and N2 protection. Isophorone diisocyanated (21.42 grams, 0.0965 mole acquired from Chovestro) was added and stirred for 10 minutes. Titanium ethyl acetoacetate (12 ppm of Ti, acquired under the tradename Tytan S2 from Borica) was charged and the mixture heated to a temperature of 80° C. The reaction proceeded at 80° C. until the NCO content was reduced to 0% by titration, and then 20.82 gram of isopropyltrimethoxysilane (Silquest A-link 35 from Momentive) added in. The capping reaction continued at 70-75° C. until the NCO reduced near to 0% by titration. The heater was turned off. Methanol (0.056 gram) and vinyltrimethoxysilane (9.35 grams, acquired under the tradename Silquest* A-171 silane from Momentive) were added. The silylated polyurethane prepolymer had no NCO content detected by FTIR with a viscosity of approximately 45,000 centipoise.

(6) M-SPUR-4: Dibutyltin Laureate Catalyzed Preparation of Trimethoxysilyl-Terminated Polyurethane Resin Into a 500 ml resin kettle were charged 371.5 grams of dried dried hydroxy-terminated polypropylene oxide (0.032 mole, acquired under the tradename HMBT 120 from Huangma Chemical) and 1.86 grams of Irganox 1135 and heated to 60° C. with stirring and N2 protection. Isophorone diisocyanated (3.53 grams, 0.16 mole acquired from Chovestro) was added and stirred for ten minutes. Dibutyltin dilaurate (12 ppm of the Sn, acquired under the tradename Fomrez SUL 4 from Momentive) was charged and heated at 70 to 73° C. until the NCO content was reduced to near 0% by titration. 3-Isopropyltrimethoxysilane (7.26 grams, 0.165 mole, acquired under the tradename Silquest A-link 35 silane from Momentive) was added and the mixture was stirred at 80 to 83° C. until the NCO content was reduced to near 0% by titration. The heat was turned off and 0.045 gram of methanol and vinyltrimethoxysilane (7.68 grams, acquired under the tradename Silquest A-171 silane from Momentive) were added. The silylated polyurethane prepolymer had no NCO content detected by FTIR with a viscosity of approximately 50,000 centipoise.

(B) Preparation of Mercapto-Functional Silicon Compound

3-Mercaptopropyltriethoxysilane (720.5 grams, 3.02 moles) Silquest A-189 (Momentive Performance Materials, Inc.), and 817.0 grams (9.07 moles) 2-methyl-1,3-propanediol (Aldrich) were charged into a 3-liter round-bottomed flask equipped with a magnetic stirrer, short path condenser and receiver flask. Sulfuric acid (0.78 gram) was added to the reaction flask and the mixture was heated to about 50° C. under a vacuum of initially 30 torr to about 10 torr for 3.5 hours. Ethanol (389.4 grams, 8.5 moles) was collected. The reaction product was then neutralized with 2.5 grams of 21 weight percent sodium ethoxy in ethanol and then stripped 1 hour. The weight of the product collected was 1108.9 grams. The mercapto-functional silicon compound will be referred to herein as MFSC.

(C) Skin Over Time (SOT) Test Procedure

The curing rates of the moisture-curable adhesive compositions of the examples that follow were determined in accordance with the skin over time (SOT) test procedure which was conducted as follows:

| Step | Description |
|---|---|
| 1 | A moisture-curable adhesive composition formulated with one of SPUR Resins A, B and C is dispensed from a cartridge onto the surface sheet of a flat sheet, e.g., of paper, plastic film, plastic board, etc., to form a bead of _____ inches in length and 0.25-0.50 inches in width. |
| 2 | A timer is started. |
| 3 | The adhesive bead sample is placed in an enclosure maintained at 50% relative humidity and 23° C. |
| 4 | After an interval of time, the surface of the adhesive bead is touched with a dry wooden spatula. The touching of the surface of the bead is done lightly so as to avoid compressing the bead to any appreciable extent. |
| 5 | If some small amount of adhesive transfers to a dry wooden spatula, after a further interval of time, repeat Step 4. Continue to repeat Step 4 until no observable amount of moisture-curable adhesive composition has transferred to a dry spatula. |
| 6 | Once no observable amount of adhesive has transferred to a dry spatula, the skin over condition has been reached. The interval between starting time (Step 2) and the time when skin over has been reached (Step 6) is recorded as skin over time (SOT). |

Example 1 and Comparative Example 1

Moisture-curable adhesive compositions of Example 1 and Comparative Example 1 were formulated with SPUR Resin A employing the components and their amounts (weight percent) indicated in Table 1 below. The adhesive compositions were then evaluated for SOT employing the aforedescribed test procedure, the results being set forth below in Table 1.

TABLE 1

Moisture Curable Adhesives and SOT Test Results

| Component | Ex. 1 | Comp. Ex. 1 |
|---|---|---|
| SPUR Resin A | 20.42 | 14.87 |
| Plasticizer (DIBP) | 17.87 | 26.63 |
| treated calcium carbonate (HiPflex, Mineral Technologies) | 51.06 | 53.25 |
| Tinuvin 213 light stabilizer (BASF) | 0.08 | 0.09 |
| Tinuvin 622DL light stabilizer (BASF) | 0.08 | 0.09 |
| hydrogenated castor oil flakes (wax) | 2.08 | 2.57 |
| TEOS-40 hydrolyzate of ethyl orthosilicate | 1.58 | 0.99 |
| surface treated clay | 5.11 | — |

TABLE 1-continued

Moisture Curable Adhesives and SOT Test Results

| Component | Ex. 1 | Comp. Ex. 1 |
|---|---|---|
| Silquest A-1100 (Momentive Performance Materials Inc.) gamma-aminopropyltriethoxysilane | 1.02 | 0.51 |
| titanium ethylacetoacetate | 0.36 | — |
| DBTDL | — | 0.99 |
| 1,8-diazabicyclo[5.4.0]undec-7-ene (DBU) | 0.36 | — |
| Total | 100.00 | 100.00 |
| SOT | <38 min | >10 hours |
| SOT, aged 2 weeks at 50% RH and 50° C., min | <20 | |

As the SOT test results in Table 1 show, the adhesive formulation of Example 1 containing a cure catalyst in accordance with the invention exhibited an SOT of less than 38 minutes compared to a SOT of greater than 10 hours exhibited by the adhesive formulation of Comparative Example 1 containing dibutylin dilaurate (DBTDL) as cure catalyst.

Examples 2 and 3 and Comparative Examples 2-8

SPUR Resin B was formulated as a base adhesive composition ("Base Adhesive") as follows:

| Base Adhesive | Wt. Percent |
|---|---|
| SPUR Resin B | 13.72 |
| Plasticizer (DIBP) | 24.69 |
| Wax (castor oil flakes) | 2.55 |
| treated calcium carbonate (HiPflex, Mineral Technologies) | 48.83 |
| Tinuvin 213 light stabilizer (BASF) | 0.08 |
| Tinuvin 622 LD light stabilizer (BASF) | 0.08 |
| Silquest A-171 (Momentive Performance Materials Inc.) vinyltrimethoxysilane | 0.96 |
| Total | 100.00 |

Fully formulated moisture-curable adhesive compositions were prepared with the Base Adhesive as set forth below in Table 2 (all amounts in weight percent):

TABLE 2

Moisture Curable Adhesive Compositions

| Component | Ex. 2 | Ex. 3 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Base Adhesive | 99.05 | 99.05 | 99.15 | 99.80 | 99.05 | 99.05 | 99.05 | 99.05 | 99.05 |
| Silquest A-1110 (Momentive Performance Materials Inc.) 3-aminopropyl-trimethoxysilane | 0.75 | 0.75 | 0.75 | | 0.75 | 0.75 | 0.75 | 0.75 | 0.75 |
| DBU | 0.10 | 0.10 | | 0.10 | 0.10 | 0.10 | 0.10 | 0.10 | 0.10 |
| DBTDL | | | 0.10 | 0.10 | 0.10 | | | | |
| titanium ethylacetoacetate | 0.10 | | | | | | | | |
| titanium (IV) butoxide | | 0.10 | | | | | | | |
| zinc octanoate | | | | | | 0.10 | | | |
| bismuth octanoate | | | | | | | 0.10 | | |
| zinc neodecanoate | | | | | | | | 0.10 | |
| bismuth neodecanoate | | | | | | | | | 0.10 |

Properties of the cured adhesive composition and the results of the SOT tests the performance of the adhesives on various substrates are set forth in Table 3 as follows:

TABLE 3

Physical Properties, SOT Test Results and Lap Shear Joint Strengths of the Cured Compositions

| Property | Ex. 2 | Ex. 3 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Stress at Break (psi) | 125.6 | 137.3 | 122.3 | 109.9 | 129.0 | 148.8 | 133.3 | 148.5 | 135.5 |
| Max. Elongation (%) | 177.4 | 194.4 | 189.3 | 588.1 | 222.4 | 166.0 | 180.3 | 188.4 | 180.3 |
| 100% Modulus (psi) | 125.3 | 129.6 | 144.9 | 20.7 | 116.4 | 143.9 | 122.7 | 127.5 | 124.5 |
| Hardness (Shore A) | 30.5 | 31.0 | 31.0 | 9.5 | 29.5 | 34.5 | 32.0 | 32.5 | 31.0 |
| SOT (hr:min) | 0:30 | 0:30 | 1:00 | 1:33 | 0:30 | 1:50 | 1:50 | 1:50 | 1:50 |
| Substrate | Lap Shear Joint Strength (psi) | | | | | | | | |
| Aluminum 2024-T3 AD-14 | 82.5 | 84.8 | 66.7 | 18.6 | 75.5 | 81.4 | 93.4 | 93.8 | 78.3 |
| Aluminum 2024-T3 AR-14 | 70.7 | 85.7 | 71.5 | 13.3 | 67.4 | 74.3 | 92.3 | 94.9 | 80.2 |
| Ground Steel | 84.2 | 83.6 | 69.9 | 13.1 | 75.6 | 81.8 | 96.9 | 87.3 | 87.5 |
| Polyvinyl (PVC) | 41.5 | 25.2 | 27.9 | 8.1 | 38.3 | 32.5 | 37.7 | 36.6 | 40.2 |
| Poly(methylmethacrylate) | 37.7 | 45.9 | 44.3 | 20.4 | 38.5 | 58.5 | 84.3 | 49.9 | 60.3 |
| Polethylene Terephthalate (PET) | 13.1 | 19.5 | 86.0 | 10.5 | 23.5 | 27.2 | 21.5 | 20.6 | 25.9 |
| Poly(acrylonitrile-butadiene-styrene) (ABS) | 59.2 | 48.0 | 78.5 | 13.6 | 59.8 | 61.6 | 42.4 | 69.4 | 79.7 |
| Polycarbonate | 13.9 | 17.4 | 62.3 | 10.9 | 11.5 | 20.2 | 12.4 | 16.6 | 12.3 |

As the data in Table 3 show, the adhesive compositions of Examples 2 and 3 containing cure catalysts in accordance with the invention exhibited SOTs on a par with the adhesive composition of Comparative Example 4 containing dibutylin dilaurate (DBTDL) as cure catalyst and faster SOTs than those of Comparative Examples 1, 2 and 5-8 containing other cure catalyst systems.

For most of the substrates tested, the lap shear joint strengths (a measure of adhesion) of the cured adhesive compositions of Examples 2 and 3 were in most cases comparable to, and in some cases exceeded, those of the cured adhesive compositions of Comparative Examples 2-8.

Examples 4 and 5 and Comparative Examples 9-14

The moisture-curable adhesive compositions of Examples 4 and 5 and Comparative Examples 9-14 were prepared with the Base Adhesive, supra, as indicated below in Table 4 (all amounts in weight percent):

TABLE 4

Moisture-Curable Adhesive Compositions

| Component | Ex. 4 | Ex. 5 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|
| Base Adhesive | 99.05 | 99.05 | 99.15 | 99.40 | 99.40 | 99.15 | 99.15 | 99.15 |
| Silquest A-1110 | | | 0.75 | 0.50 | 0.50 | | | |
| Silquest A-187 (Momentive Performance Materials Inc.) 3-glycidoxypropyltrimethoxysilane | | | | | | 0.75 | 0.75 | 0.75 |
| Silquest A-Link 600 (Momentive Performance Materials Inc.) aminosilane | 0.75 | 0.75 | | | | | | |
| DBU | 0.10 | 0.10 | 0.10 | | | | | |
| DBTDL | | | | | | | | 0.10 |
| titanium ethylacetoacetate | 0.10 | | | 0.10 | | 0.10 | | |
| titanium butoxide | | 0.10 | | | 0.10 | | 0.10 | |

The properties of the cured adhesive compositions and the results of the SOT tests are

TABLE 5

Properties of the Cured Adhesives and SOT Test Results

| Property | Ex. 4 | Ex. 5 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|
| Stress at Break (psi) | 116.8 | 127.4 | 148.3 | 118.1 | 100.9 | 102.4 | 115.6 | 137.1 |
| Max. Elongation (%) | 342.7 | 346.9 | 193.9 | 250.5 | 117.6 | 243.9 | 274.0 | 253.9 |
| 100% Modulus (psi) | 68.2 | 75.2 | 104.1 | 82.9 | 81.0 | 62.1 | 72.1 | 63.7 |
| Hardness (Shore A) | 25.0 | 26.0 | 31.0 | 20.0 | 21.0 | 25.0 | 26.0 | 25.0 |
| SOT (hr:min) | 00:30 | 00:30 | 01:37 | 06:45 | 05:20 | >14:00 | 08:00-14:00 | 00:30 |

The SOT test results for the adhesive compositions of Examples 4 and 5 containing cure catalysts in accordance with the invention were far superior to those obtained with the adhesive compositions of Comparative Examples 9-13 containing other cure catalyst systems. The properties of the cured adhesives of Examples 4 and 5 were in many cases comparable to those of Comparative Examples 9-14 and in some instances superior thereto.

Examples 6 and 7 and Comparative Examples 15-20

The Base Adhesive was formulated as the moisture-curable adhesive compositions of Examples 6 and 7 and Comparative Examples 15-20 as indicated below in Table 6 (all amounts in weight percent). All of the adhesive compositions contained a mixture and/or complex of the amidine compound DBU. Of those adhesives containing both DBU and an organometallic compound, only in the adhesives of Examples 6 and 7 was the organometallic compound an organotitanium compound.

TABLE 6

Moisture-Curable Adhesive Compositions

| Component | Ex. 6 | Ex. 7 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|
| Base Adhesive | 99.80 | 99.80 | 99.90 | 99.80 | 99.80 | 99.80 | 99.80 | 99.80 |
| DBU | 0.10 | 0.10 | 0.10 | 0.10 | 0.10 | 0.10 | 0.10 | 0.10 |
| DBTDL | | | | 0.10 | | | | |
| titanium ethylacetoacetate | 0.10 | | | | | | | |
| titanium botoxide | | 0.10 | | | | | | |
| zinc octanoate | | | | | 0.10 | | | |
| bismuth (IV) octanoate | | | | | | 0.10 | | |
| zinc neodecanoate | | | | | | | 0.10 | |
| bismuth neodecanoate | | | | | | | | 0.10 |

Properties of the cured compositions and the results of the SOT tests are set forth in Table 7 as follows:

TABLE 7

Properties of the Cured Adhesives and SOT Results

| Property | Ex. 6 | Ex. 7 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|
| Stress at Break (psi) | 110.6 | 110.2 | 116.4 | 109.9 | 106.0 | 125.8 | 103.1 | |
| Max. Elongation (%) | 525.3 | 534.4 | 486.1 | 588.1 | 330.6 | 427.7 | 458.7 | |
| 100% Modulus (psi) | 26.4 | 26.3 | 26.1 | 20.7 | 46.12 | 35.3 | 46.0 | |
| Hardness (Shore A) | 12.0 | 13.5 | 14.0 | 9.5 | 23.0 | 18.0 | 18.0 | |
| Skin Over Time (hr:min) | 00:24 | 00:12 | 01:44 | 1:33 | 04:07 | 05:08 | 02:28 | 2:55 |

As the data in Table 7 show, while the physical properties of all of the cured adhesive compositions were for the most part comparable, the adhesive compositions of Examples 6 and 7 containing a cure catalyst in accordance with the invention provided greatly improved SOTs over those of Comparative Examples 15-20. Comparative Example 15 demonstrated that DBU alone is not an affective catalyst. Tin and other non-tin cure catalysts were not as affective at achieving rapid SOTs as were the mixtures of organotitanium compounds and DBU.

Comparative Examples 21-28

Moisture-curable adhesive compositions were prepared with the Base Adhesive and various organometallic compounds other than those containing titanium. The composition of each adhesive (all amounts in weight percent), the properties of the cured adhesive and their SOTs are set forth below in Table 8:

TABLE 8

Moisture-Curable Adhesive Compositions, Properties of the Cured Adhesive and SOT Test Results

| Component | Comp. Ex. 21 | Comp. Ex. 22 | Comp. Ex. 23 | Comp. Ex. 24 | Comp. Ex. 25 | Comp. Ex. 26 | Comp. Ex. 27 | Comp. Ex. 28 |
|---|---|---|---|---|---|---|---|---|
| SPUR Resin B | 99.25 | 99.15 | 99.40 | 99.40 | 99.15 | 99.15 | 99.15 | 99.15 |
| Silquest A-1110 | 0.75 | 0.75 | 0.50 | 0.50 | 0.75 | 0.75 | 0.75 | 0.75 |
| DBTDL | | 0.10 | | | | | | |
| titanium ethylacetoacetate | | | | 0.10 | | | | |
| titanium (IV) butoxide | | | | | 0.10 | | | |
| zinc octanoate | | | | | | 0.10 | | |
| bismuth octanoate | | | | | | | 0.10 | |
| zinc neodecanoate | | | | | | | | 0.10 |
| bismuth neodecanoate | | | | | | | | 0.10 |
| Cured Adhesive Tensile Strengths and SOT Test Results | | | | | | | | |
| Stress at Break (psi) | 123.2 | 122.3 | 118.1 | 100.9 | 133.1 | 135.0 | 131.5 | 150.5 |
| Max. Elongation (%) | 120.4 | 189.3 | 250.5 | 177.6 | 126.5 | 124.9 | 107.9 | 128.4 |
| 100% Modulus (psi) | 109.0 | 144.9 | 82.9 | 81.0 | 117.6 | 120.2 | 105.3 | 132.0 |
| Hardness Shore A) | 31.0 | 31.0 | 20.9 | 21.0 | 33.0 | 33.0 | 36.0 | 36.0 |
| Skin Over Time (hr:min) | >08:00 | 01:00 | 06:45 | 05:20 | >08:00 | >08:00 | >08:00 | 06:06 |

As the data in Table 8 show, organometallic catalysts that are known for use in the curing of alkoxysilyl-containing polymers such as SPUR Resin B of the Base Adhesive require cure times that are far longer than those provided by the tin-free cure catalyst of this invention.

Examples 8-13 and Comparative Examples 29-65

SOTs were determined for moisture-curable adhesive compositions formulated with the Base Adhesive and with 0.1 weight percent each of the amine compounds and organometallic compounds listed in Table 9 below.

TABLE 9

SOT Test Results for Moisture-Curable Adhesive Compositions

| Example; Comparative Example | Amine | Organometallic Compound | | |
|---|---|---|---|---|
| | | titanium ethylacetoacetate | titanium butoxide | DBTDL |
| | | SOT Test Results (hh:mm) | | |
| Ex. 8-9; Comp. Ex. 29 | DBU | 00:15 | 00:07 | 01:39 |
| Comp. Ex. 30-32 | 2,2,6,6-tetramethylpiperidine | 08:20 | 08:18 | 05:08 |
| Ex. 10-11; Comp. Ex. 33 | 1,5-diazabicyclo[4.3.0]non-5-ene | 00:16 | 00:10 | 01:27 |
| Ex. 12-13; Comp. Ex. 34 | 1,1,3,3-tetramethylguanidine | 00:33 | 00:32 | 02:44 |
| Comp. Ex. 35-37 | 1,2,2,6,6-pentamethylpiperidine | no skin after 48 hrs. | no skin after 48 hrs. | 06:32 |
| Comp. Ex. 38-40 | 2,4,6-trimethylpyridine | 27:50 | 25:50 | 07:42 |
| Comp. Ex. 41-43 | 2,4-di-tert-butylpyridine | 30:53 | 22:11 | 07:38 |
| Comp. Ex. 44-46 | hexylamine | 23:38 | 09:07 | 02:48 |
| Comp. Ex. 47-49 | N-hexylmethylamine | 06:01 | 05:59 | 03:36 |
| Comp. Ex. 50-52 | N,N-Dimethylhexylamine | 26:56 | 23:35 | 05:58 |
| Comp. Ex. 53-55 | triethylamine | 08:46 | 09:00 | 05:07 |
| Comp. Ex. 56-58 | no amine | 20:54 | 23:13 | 07:39 |
| Comp. Ex. 59-61 | DABCO (1:1 wt. ratio in methanol) | 02:20 | 04:59 | 02:22 |
| Comp. Ex. 62-63 | primary aminoalkoxysilane | | 29:23 | 02:18 |
| Comp. Ex. 64-65 | triisobutylphosphatrane | 08:20 | | 07:46 |

As shown in Table 9, the SOTs of the adhesives of Examples 8-13 containing a cure catalyst in accordance with the invention were far better compared to those of Comparative Examples 29-65 containing other combinations of amine and the organotin compound DBTDL.

Examples 14-17

Moisture-curable adhesive compositions were prepared with the components and their amounts (weight percent) shown below in Table 10. The SOT test results are included in the table.

TABLE 10

Moisture Curable Coating Compositions and SOT Test Results

| Component | Ex. 14 | Ex. 15 | Ex. 16 | Ex. 17 |
|---|---|---|---|---|
| SPUR Resin B | 13.70% | 13.63% | 13.63% | 14.53% |
| diisonyl phthalate | 21.46% | 21.36% | 21.36% | 22.60% |
| Silquest A-171 | 1.72% | 1.71% | 1.71% | 1.61% |
| hydrogenated castor oil flakes (wax) | 1.92% | 1.91% | 1.91% | 1.45% |
| barium sulfate | 59.44% | 59.14% | 59.14% | 58.12% |
| MFSC | 1.52% | 1.52% | 2.02% | 1.00% |
| gamma-aminopropyl-triethoxysilane | | | | 0.41% |
| Silquest A-187 | | 0.51% | | |
| DBU | 0.12% | 0.12% | 0.12% | 0.13% |
| titanium ethylacetoacetate | 0.12% | 0.12% | 0.12% | 0.13% |
| Total | 100.00% | 100.00% | 100.00% | 100.00% |
| SOT, min | 14 | 14 | 20 | <10 |

The moisture curable compositions of Table 10 indicate that MFSC can be used in the formulation containing other adhesion promoters and the non-tin cure catalyst of the invention.

Example 18

Comparative Examples 66-70

A commercially available alkoxy-terminated methyl phenyl silicone resin (CoatOSil 165, Momentive Performance Materials Inc.) was formulated into moisture-curable clear coating compositions as shown below in Table 11 (all amounts in weight percent). Each coating composition was sprayed onto a water break-free cold rolled steep panel which had been cleaned with an alkaline solution. Coating thickness was approximately 2 mils. Curing conditions were 30 minutes at ambient temperature and 50% relative humidity followed by 4 hours at 100° C. and 50% relative humidity. The curing behavior of the applied coatings is indicated below in Table 11.

TABLE 11

Moisture-Curable Coating Composition and Curing Behavior

| Coating Composition | Ex. 18 | Comp. Ex. 66 | Comp. Ex. 67 | Comp. Ex. 68 | Comp. Ex. 69 | Comp. Ex. 70 |
|---|---|---|---|---|---|---|
| alkoxy-terminated methyl phenyl silicone resin | 98.5 | 98.5 | 98.5 | 98.5 | 98.5 | 98.5 |
| aminoalkoxysilane | 0.5 | 0.5 | 0.5 | 0.5 | 0.5 | 0.5 |
| titanium butoxide | — | 1 | — | — | — | — |
| titanium ethylacetoacetate | 0.5 | — | 1 | — | — | — |
| DBU | 0.5 | — | — | 1 | — | — |
| DBTDL | — | — | — | — | 1 | — |
| Titanium butoxide | — | — | — | — | — | 1 |
| Coating cured | Yes | No | No | No | No | No |

As indicated in Table 11, only the moisture-curable coating composition of Example 18 illustrating a non-tin curing catalyst in accordance with the invention underwent curing; the curing catalysts of Comparative Examples 66-70 failed to result in the curing of their coatings.

Examples 19-20

Comparative Examples 71-74

Sealant Formulations based upon E-SPUR resin, physical and curing properties were prepared and tested as described above. The formulations and test results are presented in Table 12.

Examples 21-22

Comparative Examples 75-78

Sealant Formulations based upon E-SPUR resin, physical and curing properties were prepared and tested as described above. The formulations and test results are presented in Table 13.

TABLE 12

Sealant formulations, caring times and test results of the cured sealant.

| EXAMPLES | Comp. Ex. 71 wt. % | Ex. 19 wt. % | Comp. Ex. 72 wt. % | Comp. Ex. 73 wt. % | Ex. 20 wt. % | Comp. Ex. 74 wt. % |
|---|---|---|---|---|---|---|
| E-SPUR-1 | 13.40% | 13.40% | 13.40% | | | |
| E-SPUR-2 | | | | 13.40% | 13.40% | 13.40% |
| DIDP | 22.94% | 22.94% | 22.94% | 22.94% | 22.94% | 22.94% |
| Silquest* A-171 silane | 0.95% | 0.95% | 0.95% | 0.95% | 0.95% | 0.95% |
| HiPflex (CaCO$_3$) | 50.50% | 50.50% | 50.50% | 50.50% | 50.50% | 50.50% |
| Translink 37 (clay) | 10.50% | 10.50% | 10.50% | 10.50% | 10.50% | 10.50% |
| Tinuvin 213 | 0.08% | 0.08% | 0.08% | 0.08% | 0.08% | 0.08% |
| Tinuvin 622DL | 0.08% | 0.08% | 0.08% | 0.08% | 0.08% | 0.08% |
| Silquest A-1110 | 0.75% | 0.75% | 0.75% | 0.75% | 0.75% | 0.75% |
| Dibutyltin dilaurate | 0.80% | | | 0.80% | | |
| Titanium ethylacetoacetate | | 0.40% | | | 0.40% | |
| 1,8-Diazabicyclo[5.4.0]undec-7-ene (DBU) | | 0.40% | | | 0.40% | |
| K-Kat 670 | | | 0.80% | | | 0.80% |
| Total: | 100.00% | 100.00% | 100.00% | 100.00% | 100.00% | 100.00% |
| Stress at Break (psi) | 129.0 | 160.6 | 137.4 | 38.8 | ^ | 45.0 |
| Max. Elongation (%) | 284.0 | 628.2 | 318.7 | 218.7 | ^ | 299.0 |
| 100% Modulus (psi) | 90.7 | 70.1 | 94.4 | 18.7 | ^ | 19.8 |
| Hardness: Shore A | 34.0 | 27.5 | 35.7 | 6.8 | ^ | 9.3 |
| Skin Over Time (hr:min): | >03:20 (5.5 hrs.)* | 01:49 00:51 (24 hrs.)* 00:29 (48 hrs.)* | 01:32 | 20:00 > 07:00 | 01:25 | 05:42 |

*"hrs." means skin over time measured hours after formulation was made
^ Cured formulation too soft for tensile test

TABLE 13

Sealant formulations (Examples 21 and 22, and Comparative Examples 75-78) based on M-SPUR-3 and M-SPUR-4 curing times and test results of the cured sealant.

| EXAMPLES | Comp. Ex. 75 wt. % | Ex. 21 wt. % | Comp. Ex. 76 wt. % | Comp. Ex. 77 wt. % | Ex. 22 wt. % | Comp. Ex. 78 wt. % |
|---|---|---|---|---|---|---|
| M-SPUR-3 | 13.40% | 13.40% | 13.40% | | | |
| M-SPUR-4 | | | | 13.40% | 13.40% | 13.40% |
| DIDP | 23.54% | 23.54% | 23.54% | 23.54% | 23.54% | 23.54% |
| Silquest A-171 silane | 0.95% | 0.95% | 0.95% | 0.95% | 0.95% | 0.95% |
| HiPflex (CaCO$_3$) | 50.50% | 50.50% | 50.50% | 50.50% | 50.50% | 50.50% |
| Translink 37 (clay) | 10.50% | 10.50% | 10.50% | 10.50% | 10.50% | 10.50% |
| Tinuvin 213 | 0.08% | 0.08% | 0.08% | 0.08% | 0.08% | 0.08% |
| Tinuvin 622DL | 0.08% | 0.08% | 0.08% | 0.08% | 0.08% | 0.08% |
| Silquest A-1100 | 0.75% | 0.75% | 0.75% | 0.75% | 0.75% | 0.75% |
| Dibutyltin dilaurate | 0.20% | | | 0.20% | | |
| Titanium ethylacetoacetate | | 0.10% | | | 0.10% | |
| 1,8-Diazabicyclo[5.4.0]undec-7-ene (DBU) | | 0.10% | | | 0.10% | |
| K-Kat 670 | | | 0.20% | | | 0.20% |
| Total: | 100.00% | 100.00% | 100.00% | 100.00% | 100.00% | 100.00% |
| Stress at Break (psi) | 109.4 | 121.5 | 138.6 | 76.7 | 85.6 | 105.7 |
| Max. Elongation (%) | 254.6 | 245.1 | 175.4 | 289.4 | 271.8 | 203.3 |
| 100% Modulus (psi) | 74.5 | 85.5 | 113.0 | 49.7 | 53.3 | 78.4 |
| Hardness: Shore A | 29.3 | 30.3 | 35.2 | 19.0 | 21.7 | 28.3 |
| Skin Over Time (hr:min): | 00:15 | 00:23 | 25:00 | 00:16 | 00:46 | >30:00 |

While the invention has been described with reference to certain embodiments, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

The invention claimed is:

1. A moisture-curable composition comprising:
a) at least one alkoxysilyl-containing polymer;
b) at least one non-tin cure catalyst comprising a mixture and/or complex of an organotitanium compound, wherein the organotitanium compound is a titanium carboxylate of a carboxylic acid of general Formula (VII):

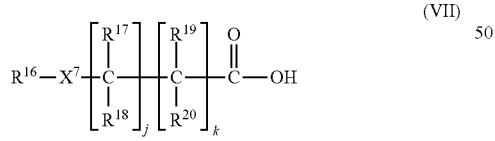

wherein
R$^{16}$ is hydrogen, C$_1$-C$_{25}$ alkly, C$_2$-C$_{25}$ alkyl interrupted by oxygen or sulfur; C$_2$-C$_{24}$ alkenyl, C$_4$-C$_{15}$ cycloalkyl which is unsubstituted or substituted by C$_1$-C$_4$ allyl and/or carboxyl; C$_5$-C$_{15}$ cycloalkenyl which is unsubstituted or substituted by C$_1$-C$_4$ alkyl and/or carboxyl; C$_{13}$-C$_{26}$ polycycloalkyl, C$_7$-C$_9$ phenylalkyl which is unsubstituted or substituted on the phenyl ring by C$_1$-C$_4$ alkyl; a 5- or 6-membered heterocyclic ring which is unsubstituted or substituted by C$_1$-C$_4$ alkyl, C$_1$-C$_4$ alkoxy, halogen or carboxyl; a 5- or 6-membered heterocyclic ring which is benzo-fused and is unsubstituted or substituted by C$_1$-C$_4$ alkyl, C$_1$-C$_4$ alkoxy, halogen or carboxyl; or a radical of one of the following formulas:

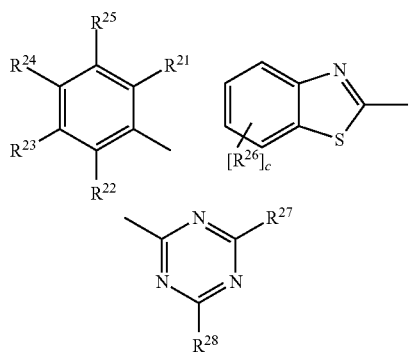

wherein
R$^{17}$, R$^{18}$, R$^{19}$ and R$^{20}$ are independently hydrogen, hydroxyl, C$_1$-C$_{18}$ alkoxy, C$_2$-C$_{18}$ alkoxy which is interrupted by oxygen or sulfur; C$_1$-C$_{25}$ alkyl, C$_2$-C$_{25}$ alkyl which is interrupted by oxygen or sulfur; C$_2$-C$_{24}$ alkenyl, C$_5$-C$_{15}$ cycloalkyl which is unsubstituted or substituted by C$_1$-C$_4$ alkyl; C$_5$-C$_{15}$ cycloalkenyl which is unsubstituted or substituted by C$_1$-C$_4$ alkyl; phenyl or naphthyl which is unsubstituted or substituted by C$_1$-C$_4$ alkyl; C$_7$-C$_9$ phenylalkyl which is unsubstituted or substituted on the phenyl ring by C$_1$-C$_4$ alkyl; C$_{10}$-C$_{12}$ naphthylalkyl which is unsubstituted or substituted on the naphthyl ring system by C$_1$-C$_4$ alkyl; or are —COR$^{29}$, with the proviso that, if one of the radicals R$^{17}$, R$^{18}$, R$^{19}$ and R$^{20}$, is hydroxyl, the other radical attached to the same carbon atom is other than hydroxyl; or else R$^{17}$, R$^{18}$, R$^{19}$ and R$^{20}$ together with the carbon atom to which they are attached form an unsubstituted or C$_1$-C$_4$ alkyl-substituted C$_5$-C$_{12}$ cycloalkylidene ring;

$R^{29}$ is hydroxyl, $C_1$-$C_{18}$ alkoxy, $C_2$-$C_{18}$ alkoxy which is interrupted by oxygen or sulfur,

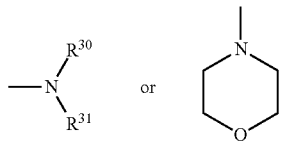

$R^{21}$, $R^{22}$, $R^{23}$, $R^{24}$ and $R^{25}$ are independently hydrogen, hydroxyl, halogen, nitro, cyano, $CF_3$, —$COR^{29}$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxygen or sulfur; $C_1$-$C_{18}$ alkylthio, $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; phenoxy or naphthoxy which is unsubstituted or substituted by $C_1$-$C_4$ alkyl; $C_7$-$C_9$ phenylalkoxy which is unsubstituted or substituted on the phenyl ring by $C_1$-$C_4$ alkyl; $C_{10}$-$C_{12}$ naphthylalkoxy which is unsubstituted or substituted on the naphthyl ring system by $C_1$-$C_4$ alkyl; or $R^{22}$ and $R^{23}$, $R^{23}$, and $R^{24}$, $R^{24}$ and $R^{25}$, or $R^{21}$ and $R^{25}$, together with the carbon atoms to which they are attached, form an unsubstituted or $C_1$-$C_4$ alkyl-, halogen- or $C_1$-$C_4$ alkoxy-substituted benzo ring, with the proviso that at least one of the radicals $R^{21}$, $R^{22}$, $R^{23}$, $R^{24}$ and $R^{25}$ is hydrogen;

$R^{26}$ is hydroxyl, halogen, nitro, cyano, $CF_3$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxygen or sulfur; $C_1$-$C_{18}$ alkylthio; of $C_2$-$C_{24}$ alkenyl;

$R^{27}$ and $R^{28}$ are independently hydrogen, $C_1$-$C_{25}$ alkyl, $C_1$-$C_{18}$ alkoxy or —Y—$(CH_2)_s$ $COR^{29}$;

$R^{30}$ and $R^{31}$ are independently hydrogen, $C_1$-$C_{25}$ alkyl, $C_3$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; phenyl or naphthyl which is unsubstituted or substituted by $C_1$-$C_4$ alkyl; $X^7$ is a direct bond, oxygen, sulfur, C(O), $C_1$-$C_{18}$ alkylene, $C_2$-$C_{18}$ alkylene which is interrupted by oxygen or sulfur; $C_2$-$C_{18}$ alkenylene, $C_2$-$C_{18}$ alkynylene, $C_2$-$C_{20}$ alkylidene, $C_7$-$C_{20}$ phenylalkylidene or $C_5$-$C_8$ cycloalkylene, with the proviso that, if i and k are 0, $X^7$ is other than oxygen and sulfur;

Y is oxygen or —$R^{32}$—N(—)$_2$ in which $R^{32}$ is hydrogen or $C_1$-$C_8$ alkyl; and j and k are independently 0 to about 10, c is from 0 to 4 and s is 1 to about 8, and a compound derived from amidine containing at least one (—)$_2$N—C=N— linkage, selected from the group consisting of Formulae (IX), (X) and (XI):

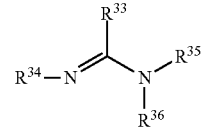

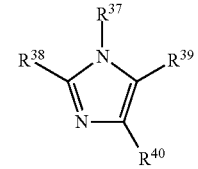

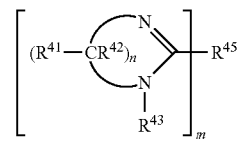

wherein:
$R^{33}$ is hydrogen, $C_1$-$C_{36}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl, or a hydroxyl group which is optionally etherified with a hydrocarbyl group having up to 8 carbon atoms;

$R^{34}$ and $R^{35}$ are each independently hydrogen, $C_1$-$C_{25}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, or $C_7$-$C_9$ phenylalkyl which is unsubstituted or substituted on the phenyl ring by $C_1$-$C_4$ alkyl, or $R^{34}$ and $R^{35}$ are joined to one another by an (—)$_2$N=C—N— linkage to form a heterocyclic ring with one or more hetero atoms or a fused bicyclic ring with one or more heteroatoms;

$R^{36}$ is hydrogen, $C_1$-$C_{36}$ alkyl, $C_1$-$C_{36}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_13$-$C_{26}$ polycycloalkyl, $C_7$-$C_9$ phenylalkyl which is unsubstituted or substituted on the phenyl ring by $C_1$-$C_4$ alkyl, or a hydroxyl group which can be optionally etherified with a hydrocarbyl group having up to about 8 carbon atoms;

$R^{37}$, $R^{38}$, $R^{39}$ and $R^{40}$ are independently hydrogen, alkyl, substituted alkyl, hydroxyalkyl, aryl, aralkyl, cycloalkyl, heterocyclyl, ether, thioether, halogen, nitro, keto, ester, or carbonamide, optionally alkyl substituted with alkyl, substituted alkyl, hydroxyalkyl, aryl, aralkyl, cycloalkyl, heterocyclyl, ether, thioether, halogen, nitro, keto or ester;

$R^{41}$, $R^{42}$ and $R^{43}$ are independently hydrogen, alkyl, alkenyl or alkoxy of from 1 to about 36 carbons, cycloalkyl of from 5 to about 32 carbons, alkylamino of from 1 to about 36 carbon atoms, phenyl, hydroxyalkyl, hydroxycycloalkyl of from 1 to about 20 carbon atoms, methoxyalkyl of from 1 to about 20 carbon atoms, aralkyl of from 7 to 9 carbon atoms, wherein the aryl group of the aralkyl is optionally further substituted by alkyl of from 1 to about 36 carbon atoms, ether, thioether, halogen, —N($R^{44}$)$_2$, polyethylene polyamines, nitro groups, keto groups, ester groups, or carbonamide groups, and the alkyl group of the aralkyl is optionally further substituted with alkyl, substituted alkyl, hydroxyalkyl, aryl, aralkyl, cycloalkyl, heterocyclics, ether, thioether, halogen, —N($R^{44}$)$_2$, polyethylene polyamines, nitro groups, keto groups or ester groups; and wherein each $R^{44}$ is independently alkyl, alkylene, aryl, aralkyl, cycloalkyl or heterocyclic radical, optionally substituted with halogen, nitro, alkyl, alkoxy or amino;

$R^{45}$ is hydrogen or an organic group;

m is 1 or 2; and n is 2 or 3.

2. The moisture-curable composition of claim 1 wherein the alkoxysilyl-containing polymer (a) has at least one alkoxysilyl group containing 2 or 3 alkoxy groups.

3. The moisture-curable composition of claim 2 wherein the alkoxysily group has at least one alkoxy group containing at least 2 carbon atoms.

4. The moisture-curable composition of claim 2 wherein the alkoxy groups contain at least 2 carbon atoms.

5. The moisture-curable composition of claim 1 wherein alkoxysilyl-containing polymer (a) is a non-silicone resin.

6. The moisture-curable composition of claim 5 wherein the non-silicone resin is an alkoxysilyl-containing resin of general Formula (III):

$$P[\text{-L-SiR}^7_{(3-a)}X^4_a]_q \qquad (III)$$

wherein:

P is a polymer residue derived from at least one addition or condensation monomer;

L is a divalent linking group;

each $R^7$ is independently an alkyl group having from 1 to 6 carbon atoms, a phenyl group or an arenyl group having from about 7 to about 12 carbon atoms;

each $X^4$ is independently an alkoxy group having from 1 to about 6 carbon atoms or an alkoxy group having from 1 to about 6 carbon atoms and at least one ether or ester functional group;

each a is independently 1, 2 or 3; and, q is from 1 to about 15.

7. The moisture-curable composition of claim 6 wherein polymer residue P is chosen from one of polyether, polyester, polyether-co-polyester, polyester-co-polyether, polythioether, polyamine, polyamide, polyester-co-polyamide, polyacrylate, polyacetal, polycarbonate, polybutadiene, polyolefin, polyurethane, polyurea, polyacrylate or polymethacrylate.

8. The moisture-curable composition of claim 1 wherein alkoxysilyl-containing polymer (a) is obtained from at least one of (i) silylation of active hydrogen-containing polymer with isocyanatosilane, (ii) silylation of isocyanate-terminated polymer with silane possessing functionality for isocyanate, (iii) polymerization of ethylenically unsaturated silane, (iv) copolymerization of ethylenically unsaturated silane and ethylenically unsaturated non-silane, or (v) hydrosilylation of ethylenically unsaturated polymer by a hydrosilane.

9. The moisture-curable composition of claim 8 wherein the active hydrogen-containing polymer is polyether polyol, polyester polyol or hydroxyl-terminated polyurethane and the isocyanate-terminated polymer is an isocyanate-terminated polyurethane.

10. The moisture-curable composition of claim 1 wherein alkoxysilyl-containing polymer (a) is prepared in the presence of an organotitanium catalyst, and the subsequent addition of the compound derived from amidine containing at least one (—)$_2$N—C=N— group-to the polymer product results in non-tin cure catalyst (b).

11. The moisture-curable composition of claim 1 comprising at least one additional component (d) selected from the group consisting of organic solvent, polysiloxane, isocyanate-reactive scavenging agent, water scavenger agent, desiccant, non-silicon-based epoxy hardener, surfactant, colorant, plasticizer, extender, filler, reinforcing agent, organic resin modifier, UV stabilizer, color stabilizer, wetting agent, flow and leveling additive, thixotrope and defoamer.

12. The moisture-curable composition of claim 1 formulated as a coating, sealant or adhesive.

13. A cured composition resulting from the curing of the moisture-curable composition of claim 1.

14. The moisture-curable composition of claim 1 wherein the compound derived from amidine compound is at least one member selected from the group consisting of N'-cyclohexyl-N,N-dimethylformamidine, N'-methyl-N,N-di-n-butylacetamidine, N'-octadecyl-N,N-dimethylformamidine, N'-cyclohexyl-N,N-dimethylvaleramidine, 1-methyl-2-clohexyliminopyrrolidine, 3-butyl-3,4,5,6-tetrahydropyrimidine, N-(hexyliminomethy)morpholine, N-alpha-decylimino-ethyl)ethyl)pyrrolidine, N'-decyl-N,N-dimethylformamidine, N'-dodecyl-N,N-dimethylformamidine, N'-cyclohexyl-N,N-acetamidine, 1,5-diazabicyclo(4.3.0) none-5-ene, 1,8-diazabicyclo(5.4.0) undec-7-ene, 1,4-diazabicyclo(3.3.0) oct-4-ene, 2-methyl-1,5-diazabicyclo(4.3.0) none-5-ene, 2,7,8-trimethyl-1,5-diazabicyclo(4.3.0) none-5-ene, 2-butyl-1,5-diazabicyclo(4.3.0) none-5-ene, 1,9-diazabicyclo(6.5.0) tridec-8-ene, N-(2-hydroxyethyl)imidazole, N-(3-aminopropyl)imidazole, 4-(hydroxymethyl) imidazole, 1-(tert-butoxycarbonyl)imidazole, imidazole-4-propionic acid, 4-carboxylimidazole, 1-butylimidazole, 2-methyl-4-imidazolecarboxylic acid, 4-formyl imidazole, 1-(ethoxycarbonyl)imidazole, reaction product of propylene oxide with imidazole and 2-methyl imidazole, 4-(hydroxymethyl) imidazole hydrochloride, copolymer of 1-chloro-2,3-epoxypropane and imidazole, 1(p-toluenesulfonyl)imidazole, 1,1-carbonylbisimidazole, 1-(2-cyanoethyl)-2-ethyl-4-methylimidazole, 2-phenyl-2-imidazoline pyromellitate, 4-(hydroxymethyl) imidazole picrate, reaction product of 2-propenoic acid with 4,5-dihydro-2-nonyl-1H-imidazole-1-ethanol and 2-heptyl-4,5-dihydro-1H-imidazole-1-ethanol, disodium salts, 1-(cyanoethyl)-2-undecylimidazole trimellitate, 1-(2-hydroxypropyl)imidazole formate, sodium imidazolate, silver imidazolate, 1H-imidazole-1-ethanol, 2-(8Z)-8-heptadecenyl-4,5-dihydro-1H-imidazole-1-ethanol, 2-(8Z)-8-heptadecenyl-4,5-dihydro, monoacetate salt, 1H-imidazole-1-ethanol, -4,5-dihydro,-2-(9Z)-9-octadecenyl, 1H-imidazole, 4,5-dihydro,-2-(9Z)-9-octadecenyl, oleyl hydroxyethyl imidazoline, 1H-imidazole-1-ethanol, 4,5-dihydro-2-undecyl-, 1H-imidazole-1-ethanol, 2(-8-heptadecenyl)-4,5-dihydro, 1-(2-hydroxyethyl)-2-tall oil alkyl-2-imidazoline, azelaic acid salt, 1H-imidazole-1-ethanol, 2-heptadecyl-4,5-dihydro, 1H-imidazole-1-ethanol, 2-nonyl-4,5-dihydro, 1H-imidazole-1-ethanol, 4,5-dihydro-2-$C_{15\text{-}17}$-unsaturated alkyl derivatives, 1H-imidazole-1-ethanol, 4,5-dihydro-2-norcoco alkyl derivatives, 1H-imidazole-1-ethanol, 4,5-dihydro-2-nortall-oil alkyl derivatives, reaction product of 4,5-dihydro-2-nonyl 1H-imidazole-1-ethanol, and 4,5-dihydro-2-heptyl 1H-imidazole-1-ethanol with 2-propenoic acid, 1-propane sulfonic acid, 3-chloro-2-hydroxy-mono sodium salt reaction products with 2-(8Z)-8-heptadecenyl-4,5-dihydro 1H-imidazole-1-ethanol, chloroacetic acid sodium salt reaction products with 1H-imidazole-1-ethanol, 4,5-dihydro-2-norcoco alkyl derivatives, and sodium hydroxide, 2-(8-heptadecenyl)-4,5-dihydro 1H-imidazole-1-ethanamine, or the 9-octadecenoic acid compound with 2-(8-heptadecenyl)-4,5-dihydro 1H-imidazole-1-ethanamine.

15. A moisture-curable composition comprising
a) an alkoxysilyl-containing silicone resin; and
b) at least one non-tin cure catalyst comprising a mixture and/or complex of an organotitanium compound and compound derived from amidine containing at least one(—)$_2$N—C═N—linkage selected from the group consisting of Formulae (IX),(X) and (XI);

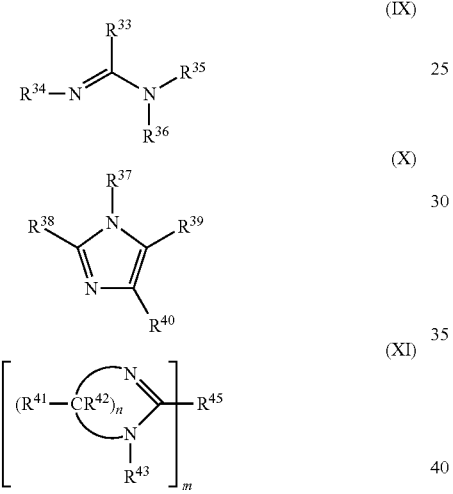

wherein
$R^{33}$ is hydrogen, $C_1$-$C_{36}$ alkyl, $C_2$-$C_{25}$ alkyl interrupted by oxygen or sulfur: $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl, or a hydroxyl group which is optionally etherified with a hydrocarbyl group having up to 8 carbon atoms;

$R^{34}$ $R^{35}$ are each independently hydrogen, $C_1$-$C_{25}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polucycloalkyl, or $C_7$-$C_9$ phenlalkyl which is unsubstituted or substituted on the phenyl ring by $C_1$-$C_4$ alkyl, or $R^{34}$ and $R^{35}$ are joined to one another by an (—)$_2$N═C—N— linkage to form a heterocyclic ring with one or more hetero atoms or a fused bicyclic ring with one or more heteroatoms;

$R^{36}$ is hydrogen, $C_1$-$C_{36}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_13$-$C_{26}$ polycycloalkyl , $C_7$-$C_9$ phenlalkyl which is unsubstituted or substituted on the phenyl ring by $C_1$-$C_4$ alkyl, or a hydroxyl group which can be optionally etherfied with a hydrocarbyl group having up to 8 carbon atoms;

$R^{37}$, $R^{38}$, $R^{39}$ and $R^{40}$ are independently hydrogen, alkyl, substituted alkyl, hydroxyalkyl, aryl, aralkyl, cycloalkyl, heterocyclyl, ether, thioether, halogen, nitro, keto, ester, or carbonamide, optionally alkyl substituted with alkyl, substituted alkyl, hydroxyalkyl, aryl, aralkyl, cycloalkyl, heterocyclyl, ether, thioether, halogen, nitro, keto or ester;

$R^{41}$, $R^{42}$ are $R^{43}$ are independently hydrogen, alkyl, alkenyl or alkoxy of from 1 to about 36 carbons, cycloalkyl of from 5 to about 32 carbons, alkylamino of from 1to about 36 carbon atoms, phenyl, hydroxyalkyl, hydroycycloalkyl of from 1 to about 20 carbon atoms, methoxyalkyl of from 1 to about 20 carbon atoms, arelkyl of from 7 to 9 atoms, wherein the aryl group of the aralkyl is optionally further substituted by alkyl of from 1 to about 36 carbon atoms, ether, thioether, halogen, —N($R^{44}$)$_2$, polyethylene polyamines, nitro groups, keto groups, ester groups, or carbonamide groups, and the alkyl group of the aralkyl is optionally further substituted with alkyl, substituted alkyl, hydroxyalkyl, aryl, aralkly, cycloalkyl, heterocyclics, ether, thioether, halogen, —N($R^{44}$)$_2$ ,polyethylene polyamines, nitro groups, keto groups or ester groups; and wherein each $R^{44}$ is independently alkyl, alkylene, aryl, aralkyl, cycloalkyl or heterocyclic radical, optionally substituted with halogen, nitro, alkyl, alkoxy or amino;

$R^{45}$ is hydrogen or an organic group;
m is 1 or 2; and
n is 2 or 3.

16. The moisture-curable composition of claim 15 wherein the alkoxysilyl-containing silicone resin comprises divalent units of the formula —(R$_2$SiO)— in the backbone wherein each R group independently is $C_1$-$C_{10}$-alkyl; $C_1$-$C_{10}$ alkyl substituted with one or more of Cl, F, N, O or S; phenyl; $C_7$-$C_{16}$ alkylaryl; $C_7$-$C_{16}$ arylalkyl; or $C_2$-$C_4$ polyoxyalkylene ether or a combination of two or more such groups.

17. The moisture-curable composition of claim 15 wherein the alkoxysilyl-containing silicone resin is of general Formula. (I):

$$X^1{}_aR^1{}_{(3-a)}Si—Z—[R^2{}_2SiO]_x[R^3{}_2SiO]_yZ^1SiR^1{}_{(3-a)}X^1{}_a \qquad (I)$$

wherein subscript x is 0 to about 10,000; subscript y is 0 to about 1,000; a is 1, 2 or 3; $R^1$ is independently an alkyl group having from 1 to 6 carbon atoms, a phenyl group or arenyl group having from 7 to about 12 carbon atoms; $R^2$ is methyl; Z is —O —or divalent $C_dH_{2d}$ group where d is 2 to about 6; $Z^1$ is a bond or a SiR$^3{}_2$R$^4$ group where R$^4$ is a divalent $C_dH_{2d}$ group; $R^3$ is $C_1$-$C_{10}$-alkyl, $C_1$-$C_{10}$ alkyl substituted with one or more of Cl, F, N, O, or S, phenyl, $C_7$-$C_{10}$ alkylaryl, $C_7$-$C_{16}$ arylalkyl, $C_2$-$C_4$ polyalkylene ether or a combination of two or more such groups; and, $X^1$ is independently an alkoxy group having from 1 to about 6 carbon atoms, or an alkoxy group having from 1 to about 6 carbon atoms and at least one ether or ester functional group.

18. The moisture-curable composition of claim 15 wherein the alkoxysilyl-containing silicone resin is of general Formula (II):

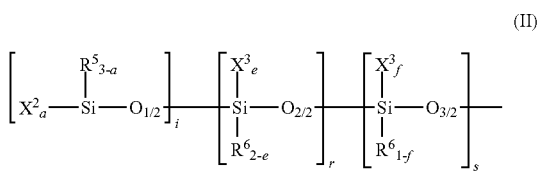

wherein:
- each $R^5$ is independently an alkyl group having from 1 to 6 carbon atoms, a phenyl group or arenyl group having from 7 to about 12 carbon atoms; each $R^6$ is independently a monovalent hydrocarbon group selected from straight chain alkyl having from 1 about 10 carbon atoms, branched chain alkyl having from 3 to about 10 carbon atoms and cyclo alkyl groups having from 3 to about 10 carbon atoms, phenyl and an arenyl groups containing from 7 to 10 carbon atoms;
- each $X^2$ is independently an alkoxy group having from 1 to about 6 carbon atoms, or an alkoxy group having from 1 to about 6 carbon atoms and at least one ether or ester functional group;
- each $X^3$ is independently a hydrolyzable group —$OR^6$; and,
- a is 1, 2 or 3, e is 0 to 2, f is 0 or 1, i is 0 to 25, r is 0 to 100 and s is 0 to about 100, with the provisos that $4 \leq i+r+s \leq 125$, $(ai+er+fs)/(3i+2r+s)$ is from 0.05 to 0.6 and all of the half oxygen atoms, $O_{1/2}$, in a repeat unit are matched with another half oxygen atom in a different repeat unit to form a full oxygen atom, —O— which covalently links two repeat units together.

19. The moisture-curable composition of claim 15 wherein the non-tin cure catalyst comprises at least one organotitanium compound selected from the group consisting of titanium carboxylate, titanium alkoxide, titanium acetylacetonate, titanium alkylsulfonate, titanium dialkylphosphate, titanium dialkylpyrophosphate, titanium arylsulfonate, titanium ketoacid, titanium ketoester and titanium diketone.

20. The moisture-curable composition of claim 19 wherein the organotitanium compound is a titanium carboxylate of a carboxylic acid of general Formula (VII):

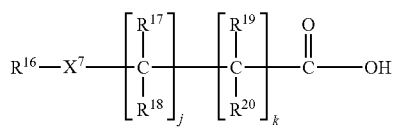

wherein:
- $R^{16}$ is hydrogen, $C_1$-$C_{25}$ alkyl, $C_2$-$C_{25}$ alkyl interrupted by oxygen or sulfur; $C_2$-$C_{24}$ alkenyl, $C_4$-$C_{15}$ cycloalkyl which is unsubstituted or substituted by $C_1$-$C_4$ allyl and/or carboxyl; $C_5$-$C_{15}$ cycloalkenyl which is unsubstituted or substituted by $C_1$-$C_4$ alkyl and/or carboxyl; $C_{13}$-$C_{26}$ polycycloalkyl, $C_7$-$C_9$ phenylalkyl which is unsubstituted or substituted on the phenyl ring by $C_1$-$C_4$ alkyl; a 5- or 6-membered heterocyclic ring which is unsubstituted or substituted by $C_1$-$C_4$ alkyl, $C_1$-$C_4$ alkoxy, halogen or carboxyl; a 5- or 6-membered heterocyclic ring which is benzo-fused and is unsubstituted or substituted by $C_1$-$C_4$ alkyl, $C_1$-$C_4$ alkoxy, halogen or carboxyl; or a radical of one of the following formulas:

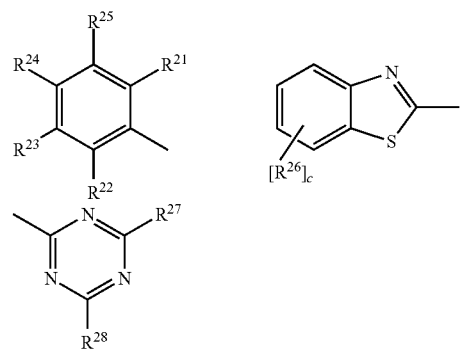

wherein:
- $R^{17}$, $R^{18}$, $R^{19}$ and $R^{20}$ are independently hydrogen, hydroxyl, $C_1$-$C_{18}$ alkoxy, $C_2$-$C_{18}$ alkoxy which is interrupted by oxygen or sulfur; $C_1$-$C_{25}$ alkyl, $C_2$-$C_{25}$ alkyl which is interrupted by oxygen or sulfur; $C_2$-$C_{24}$ alkenyl, $C_5$-$C_{15}$ is cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; or are —$COR^{29}$, with the proviso that, if one of the radicals $R^{17}$, $R^{18}$, $R^{19}$ and $R^{20}$, is hydroxyl, the other radical attached to the same carbon atom is other than hydroxyl; or else $R^{17}$, $R^{18}$, $R^{19}$ and $R^{20}$ together with the carbon atom to which they are attached form an unsubstituted or $C_1$-$C_4$ alkyl-substituted $C_5$-$C_{12}$ cycloalkylidene ring;
- $R^{29}$ is hydroxyl, $C_1$-$C_{18}$ alkoxy, $C_2$-$C_{18}$ alkoxy which is interrupted by oxygen or sulfur,

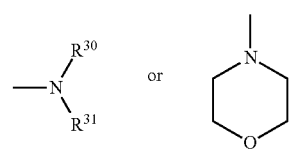

- $R^{21}$, $R^{22}$, $R^{23}$, $R^{24}$ and $R^{25}$ are independently hydrogen, hydroxyl, halogen, nitro, cyano, $CF_3$, —$COR^{29}$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxygen or sulfur; $C_1$-$C_{18}$ alkylthio, $C_2$-$C_{24}$ alkenyl, $C_5$-$C_{15}$ cycloalkyl which is unsubstituted or substituted by $C_1$-$C_4$ alkyl; $C_5$-$C_{15}$ cycloalkenyl which is unsubstituted or substituted by $C_1$-$C_4$ alkyl; phenyl or naphthyl which is unsubstituted or substituted by $C_1$-$C_4$ alkyl; $C_7$-$C_9$ phenylalkyl which is unsubstituted or substituted on the phenyl ring by $C_1$-$C_4$ alkyl; $C_{10}$-$C_{12}$ naphthylalkyl which is unsubstituted or substituted on the naphthyl ring system by $C_1$-$C_4$ alkyl; phenoxy or naphthoxy which is unsubstituted or substituted by $C_1$-$C_4$ alkyl; $C_7$-$C_9$ phenylalkoxy which is unsubstituted or substituted on the phenyl ring by $C_1$-$C_4$ alkyl; $C_{10}$-$C_{12}$ naphthylalkoxy which is unsubstituted or substituted on the naphthyl ring system by $C_1$-$C_4$ alkyl; or $R^{22}$ and $R^{23}$, $R^{23}$ and $R^{24}$, $R^{24}$ and $R_{25}$, or $R^{21}$ and $R^{25}$, together with the carbon atoms to which they are attached, form an unsubstituted or $C_1$-$C_4$ alkyl-, halogen- or $C_1$-$C_4$ alkoxy-substituted benzo ring, with the proviso that at least one of the radicals $R^{21}$, $R^{22}$, $R^{23}$, $R^{24}$ and $R^{25}$ is hydrogen;

$R^{26}$ is hydroxyl, halogen, nitro, cyano, $CF_3$, $C_1$-$C_{25}$ alkyl, $C_2$-$C_{25}$ alkyl which is interrupted by oxygen or sulfur; $C_1$-$C_{25}$ haloalkyl, $C_1$-$C_{18}$ alkoxy, $C_2$-$C_{18}$ alkoxy which is interrupted by oxgyen or sulfur; $C_1$-$C_{18}$ alkylthio; or $C_2$-$C_{24}$ alkenyl;

$R^{27}$ and $R^{28}$ are independently hydrogen, $C_1$-$C_{25}$ alkyl, $C_1$-$C_{18}$ alkoxy or —Y—$(CH_2)_s$ $COR^{29}$;

$R^{30}$ and $R^{31}$ are independently hydrogen, $C_1$-$C_{25}$ alkyl, $C_3$-$C_{25}$ alkyl which is interrupted by oxygen or sulfur; $C_2$-$C_{24}$ alkenyl, $C_5$-$C_{15}$ cycloalkyl which is unsubstituted or substituted by $C_1$-$C_4$ alkyl; phenyl or naphthyl which is unsubstituted or substituted by $C_1$-$C_4$ alkyl; $X^7$ is a direct bond, oxygen, sulfur, C(O), $C_1$-$C_{18}$ is alkylene, $C_2$-$C_{18}$ alkylene which is interrupted by oxygen or sulfur; $C_2$-$C_{18}$ alkenylene, $C_2$-$C_{18}$ is alkynylene, $C_2$-$C_{20}$ alkylidene, $C_7$-$C_{20}$phenylalkylidene or $C_5$-$C_8$ cycloalkylene, with the proviso that, if j and k are 0, $X^7$ is other than oxygen and sulfur;

Y is oxygen or —$R^{32}$—N(—)$_2$ in which $R^{32}$ is hydrogen or $C_1$-$C_8$ alkyl; and, j and k are independently 0 to about 10, c is from 0 to 4 and s is from 1 to about 8.

21. The moisture-curable composition of claim 19 wherein the organotitanium compound is at least one member selected from the group consisting of titanium (IV) butoxide, titanium (IV) methoxide, titanium (IV) ethoxide, titanium (IV) propoxide; titanium 2,4-dioxopentane, titanium 2-oxo-butanoic acid, titanium methylsulfonate, titanium phenyl sulfonate, tetra ethyl titanate, tetra iso-propyl titanate, propylbutyl titanate, polybutyl titanate, tetra n-butyl titanate, tetra n-propyl titanate, tetra 2-ethylhexyl titanate, di-iso-propoxyl titanium chelate ethylacetoacetate titanate, di-iso-butoxy titanium chelate ethylacetoacetate titanate, titanium acetylacetonate, titanium acetylacetonate in ethanol and isopropanol, triethanolamine titanate, alkanolamine titanates and titanium phosphate complex.

22. The moisture-curable composition of claim 15 comprising at least one mercapto-functional silicon-containing compound.

23. A moisture-curable composition comprising
a) at least one alkoxysilyl-containing polymer;
b) at least one non-tin cure catalyst comprising a mixture and/or complex of an organotitanium compound and compound containing at least one (—)$_2$N—C═N— linkage and derived from amidine or guanidine;
c) at least one mercapto-functional silicon compound (c) chosen from general Formulas (XVII) or (XVIII):

HSG$^2$SiZ$^\Theta$X$^8$      (XVII)

or

[HSG$^2$SiZ$^\Theta$Z$^\beta$]$_t$[HSG$^3$SiZ$^\beta$$_3$]$_u$[HSG$^4$SiZ$^\beta$$_2$X$^8$]$_v$
[[HSG$^5$SiZ$^\beta$X$^8$$_2$]$_W$      (XVIII)

wherein:
each occurrence of G$^2$, G$^3$, G$^4$ and G$^5$ is independently a hydrocarbylene group containing from 1 to 30 carbon atoms derived by substitution of a hydrogen on alkyl, cycloalkyl, alkenyl, aryl, or aralkyl;

each occurrence of Z$^\beta$, which forms a bridging structure between two silicon atoms, is independently a [—O(R$^{67}$CR$^{67}$)$_g$O—]$_{0.5}$ group paired with a different Si[—O(R$^{67}$CR$^{67}$)$_g$O—]$_{0.5}$ group to form a bridging group, Si[—O(R$^{67}$CR$^{67}$)$_g$O—]Si, in which each occurrence of R$^{67}$ is independently selected from the group consisting of hydrogen, straight alkyl, branched alkyl, cycloalkyl, alkenyl, aryl and aralkyl containing up to about 18 carbon atoms and g is an integer from 2 to about 15;

each occurrence of Z$^\Theta$, which forms a cyclic structure with a silicon atom, is independently —O(R$^{67}$CR$^{67}$)$_g$O— in which each occurrence of R$^{67}$ is independently selected from the group consisting of hydrogen, straight alkyl, branched alkyl, cycloalkyl, alkenyl, aryl, and aralkyl containing up to 18 carbon atoms and g is an integer from 2 to about 15, ;

each occurrence of X$^8$ is independently —OR$^{68}$ wherein each occurrence of R$^{68}$ is independently selected from the group consisting of hydrogen, straight alkyl, branched alkyl, cycloalkyl, alkenyl, aryl and aralkyl containing up to about 18 carbon atoms; and, t is from 0 to about 20; u is from 0 to about 18; v is from 0 to about 20; w is from 0 to about 20; with the proviso that formula(XVII), t+u+v+w is equal to or greater than 2.

24. The moisture-curable composition of claim 23 wherein the (—)$_2$ N—C═N—group-containing compound present in non-tin curing catalyst (b) is at least one compound derived from amidine or guanidine selected from the group consisting of Formulas (IX)-(XVI):

(IX)

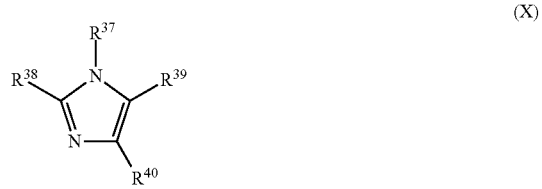
(X)

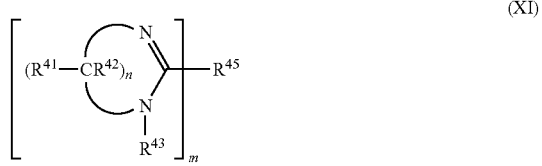
(XI)

(XII)

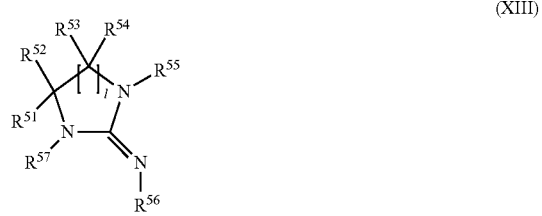
(XIII)

-continued

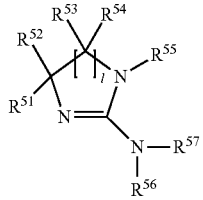

(XIV)

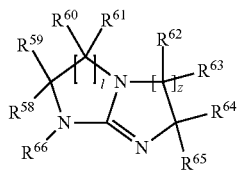

(XV)

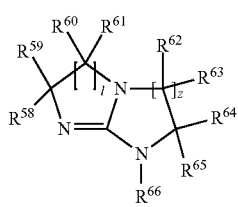

(XVI)

wherein;

R³³ is hydrogen, C₁-C₃₆ alkyl, C₂-C₂₅ alkyl interrupted by oxygen or sulfur; C₂-C₂₄ alkenyl, C₄-C₁₅ cycloalkyl which is unsubstituted or substituted by C₁-C₄ allyl and/or carboxyl; C₅-C₁₅ cycloalkenyl which is unsubstituted or substituted by C₁-C₄ alkyl and/or carboxyl; C₁₃-C₂₆ polycycloalkyl, C₇-C₉ phenylalkyl which is unsubstituted or substituted on the phenyl ring by C₁-C₄ alkyl, an amine group which is optionally substituted, or a hydroxyl group which is optionally etherified with a hydrocarbyl group having up to 8 carbon atoms;

R³⁴ and R³⁵ are each independently hydrogen, C₁-C₂₅ alkyl, C₂-C₂₅ alkyl interrupted by oxygen or sulfur; C₂-C₂₄ alkenyl, C₄-C₁5 cycloalkyl which is unsubstituted or substituted by C₁-C₄ and/or carboxyl; C₅-C₁₅ cycloalkenyl which is unsubstituted or substituted by C₁-C₄ alkyl and/or carboxyl; C₁₃-C₂₆ polycycloalkyl, or C₇-C₉ phenylalkyl which is unsubstituted or substituted on the phenyl ring by C₁-C₄ alkyl, or R³⁴ and R³⁵ are joined to one another by an (—)₂N═C—N— linkage to form a heterocyclic ring with one or more hetero atoms or a fused bicyclic ring with one or more heteroatoms;

R³⁶ is hydrogen, C₁-C₃₆ alkyl, C₁-C₃₆ alkyl interrupted by oxygen or sulfur; C₂-C₂₄ alkenyl, C₄-C₁₅ cycloalkyl which is unsubstituted or substituted by C₁-C₄ allyl and/or carboxyl; C₅-C₁₅ cycloalkenyl which is unsubstituted or substituted by C₁-C₄ alkyl and/or carboxyl; C₁3-C₂₆ polycycloalkyl, C₇-C₉ phenylalkyl which is unsubstituted or substituted on the phenyl ring by C₁-C₄ alkyl, or a hydroxyl group which can be optionally etherified with a hydrocarbyl group having up to about 8 carbon atoms;

R³⁷, R³⁸, R³⁹ and R⁴⁰ are independently hydrogen, alkyl, substituted alkyl, hydroxyalkyl, aryl, aralkyl, cycloalkyl, heterocyclyl, ether, thioether, halogen, —N(R)₂, polyethylene polyamine, nitro, keto, ester, or carbonamide, optionally substituted with alkyl, substituted alkyl, hydroxyalkyl, aryl, aralkyl, cycloalkyl, heterocyclyl, ether, thioether, halogen, —N(R)₂, polyethylene polyamine, nitro, keto or ester;

R⁴¹, R⁴² and R₄₃ are independently hydrogen, alkyl, alkenyl or alkoxy of from 1 to about 36 carbons, cycloalkyl of from 5 to about 32 carbons, alkylamino of from 1 to about 36 carbon atoms, phenyl, hydroxyalkyl, hydroxycycloalkyl of from 1 to about 20 carbon atoms, methoxyalkyl of from 1 to about 20 carbon atoms, aralkyl of from 7 to 9 carbon atoms, wherein the aryl group of the aralkyl is optionally further substituted by alkyl of from 1 to about 36 carbon atoms, ether, thioether, halogen, —N(R⁴⁴)₂, polyethylene polyamines, nitro groups, keto groups, ester groups, or carbonamide groups, and the alkyl group of the aralkyl is optionally further substituted with alkyl, substituted alkyl, hydroxyalkyl, aryl, aralkyl, cycloalkyl, heterocyclics, ether, thioether, halogen, —N(R⁴⁴)₂, polyethylene polyamines, nitro groups, keto groups or ester groups and wherein each R⁴⁴ is independently alkyl, alkylene, aryl, aralkyl, cycloalkyl or heterocyclic radical, optionally substituted with halogen, nitro, alkyl, alkoxy or amino;

R⁴⁵ is hydrogen or an organic group;

R⁴⁶-R⁶⁶ are independently hydrogen, alkyl, cycloalkyl, aryl, aromatic, organometallic, a polymeric structure or together can form a cycloalkyl, aryl, or an aromatic structure;

m is 1 or 2;

n is 2 or 3;

l is 1, 2 or 3; and z is 1,2or 3.

25. The moisture-curable composition of claim 24 wherein the compound derived from amidine or guanidine is at least one member selected from the group consisting of N'-cyclohexyh-N,N-dimethylformarnidine, N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl)morpholine, N-alpha-decylimino-ethyl(ethyl)pyrrolidine, N'-decyl-N,N-dimethylformatnidine, N'-dodecyl-N,N-dimethylformamidine, N'-cyclohexyl-N,N-acetamidine, pentamethylguanidine, tetramethylguanidine, heptamethylisobiguanide, 1,5-diazabicyclo(4.3.0) none-5-ene, 1,8-diazabicyclo(5.4.0) undec-7-ene, 1,4-diazabicyclo(3.3.0) oct-4-ene, 2-methyl-1,5-diazabicyclo(4.3.0) none-5-ene, 2,7,8-trimethyl-1,5-diazabicyclo(4.3.0) none-5-ene, 2-butyl -1,5-diazabicyclo(4.3.0) none-5-ene, 1,9-diazabicyclo(6.5.0) tridec-8-ene, N-(2-hydroxyethyl)imidazole, N-(3-aminopropyl)imidazole, 4-(hydroxymethyl) imidazole, 1-(tert-butoxycarbonyl) imidazole, imidazole-4-propionic acid, 4-carboxylimidazole, 1-butylimidazole, 2-methyl-4-imidazolecarboxylic acid, 4-formyl imidazole, 1-(ethoxycarbonyl)imidazole, reaction product of propylene oxide with imidazole and 2-methyl imidazole, 4-(hydroxymethyl) imidazole hydrochloride, copolymer of 1-Chloro-2,3-epoxypropane and imidazole, 1(p-toluenesulfonyl)imidazole, 1,1'-carbonylbisimidazole, 1-(2-cyanoethyl)-2-ethyl-4-methylimidazole, 2-phenyl-2-imidazoline pyromellitate, 4-(hydroxymethyl) imidazole picrate, reaction product of 2-propenoic acid with 4,5-dihydro-2-nonyl-1H-imiciazole-1-ethanol and 2-heptyl-4,5-dihydro-1H-imidazole-1-ethanol, disodium salts, 1-(cyanoethyl)-2-undecylimidazole trimellitate, 1-(2-hydroxypropyl)imidazole formate, sodium imidazolate, silver imidazolate, 1H-imidazole-1-ethanol, 2-(8Z)-8-heptadecenyl-4,5-dihydro, 1H-imidazole-1-ethanol, 2-(8Z)-8-heptadecenyl-4,5-dihydro, monoacetate salt, 1H-imidazole-1- ethanol, -4,5-dihydro,-2-(9Z)-9-octadecenyl, 1H-imidazole, 4,5-dihydro-2-(9Z)-9-octadecenyl, oleyl hydroxyethyl imidazoline, 1H-imidazole-1-ethanol, 4,5-dihydro-2-undecyl-, 1H-imidazole-1-ethanol, 2(-8-heptadecenyl)-4,5-dihydro, 1-(2-hydroxyethyl)-2-tall oil alkyl-2-imidazoline, azelaic acid salt, 1H-imidazole-1-ethanol, 2-heptadecyl-4,5-dihydro, 1H-imidazole-1-ethanol, 2-nonyl-4,5-dihydro, 1H-imidazole-1-ethanol, 4,5-dihydro-2-$C_{15-17}$-unsaturated alkyl derivatives, 1H-imidazole-1-ethanol, 4,5-dihydro-2-norcoco alkyl derivatives, 1H-imidazole-1-ethanol, 4,5-dihydro-2-nortall-oil alkyl derivatives, reaction product of 4,5-dihydro-2-nonyl 1H-imidazole-1-ethanol, and 4,5-dihydro-2-heptyl 1H-imidazole-1-ethanol with 2-propenoic acid, 1-propane sulthnic acid, 3-chloro-2-hydroxy-mono sodium salt reaction products with 2-(8Z)-8-heptadecenyl-4,5-dihydro 1H-imidazole-1-ethanol, chloroacetic acid sodium salt reaction products with 1H-imidazole-1-ethanol, 4,5-dihydro-2-norcoco alkyl derivatives, and sodium hydroxide, 2-(8-heptadecenyl)-4,5-dihydro 1H-imidazole-1-ethanamine, or the 9-octadecenoic acid compound with 2-(8-heptadecenyl)-4,5-dihydro 1H-imidazole-1-ethanamine.

26. The moisture-curable composition of claim 24 wherein the compound derived from amidine is at least one of 1,8-diazabicyclo[5.4.0]undec-7-ene (DBU), 1,5-diazabicyclo[4.3.0]non-5-ene and 1,1,3,3-tetramethylguanidine.

27. The moisture-curable composition of claim 24 wherein the organotitanium compound is at least one member selected from the group consisting of titanium carboxylate, titanium alkoxide, titanium acetylacetonate, titanium alkylsulfonate, titanium dialkylphosphate, titanium dialkylpyrophosphate, titanium arylsulfonate, titanium ketoacid, titanium ketoester and titanium diketone.

28. The moisture-curable composition of claim 24 wherein the organotitanium compound is at least one member selected from the group consisting of titanium (IV) butoxide, titanium (IV) methoxide, titanium (IV) ethoxide, titanium (IV) propoxide, titanium 2,4-dioxopentane, titanium 2-oxo-butanoic acid, titanium methylsulfonate, titanium phenyl sulfonate, tetra ethyl titanate, tetra iso-propyl titanate, propylbutyl titanate, polybutyl titanate, tetra n-butyl titanate, tetra n-propyl titanate, tetra 2-ethylhexyl titanate, di-iso-Propoxyl titanium chelate (ethylacetoacetate titanate) di-iso-propoxyl titanium chelate ethylacetoacetate titanate, di-iso-Butoxy titanium chelate ethylacetoacetate titanate di-iso-butoxy titanium chelate ethylacetoacetate titanate, proprietary titanium chelates, titanium acetylacetonate, titanium acetylacetonate in ethanol and isopropanol, triethanolamine titanate, alkanolamine titanates and titanium phosphate complex.

29. The moisture-curable composition of claim 23, wherein $G^2$, $G^3$, $G^4$ and $G^5$ is independently, a straight or branched chain alkylene group of from 1 to about 6 carbon atoms.

30. The moisture-curable composition of claim 23, Wherein each occurrence of $R^{67}$ is independently selected from the group consisting of hydrogen and a straight or branched chain alkyl group of from 1 to about 6 carbon atoms and g is from 2 to about 6.

31. The moisture curable compound of claim 23 wherein the organotitanium compound is of Formula (VIII):

$$Ti^{IV}L^1_4 \qquad (VIII)$$

wherein each occurrence of $L^1$ is independently an organo group containing from 1 to 20 carbon atoms and at least one lone pair of electrons on an oxygen, nitrogen or sulfur atom, in which the lone pair of electrons on the oxygen, nitrogen or sulfur atom form an ionic bond to form a salt or a dative bond to form a complex with the $Ti^{IV}$.

* * * * *